United States Patent
Yamagami et al.

(10) Patent No.: US 6,256,282 B1
(45) Date of Patent: Jul. 3, 2001

(54) OPTICAL RECORDING MEDIUM AND RECORDING METHOD THEREOF

(75) Inventors: Tamotsu Yamagami, Kanagawa; Toru Takeda, Saitama; Shoei Kobayashi, Kanagawa; Koichiro Ogihara, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/120,416

(22) Filed: Jul. 21, 1998

(30) Foreign Application Priority Data

Jul. 24, 1997 (JP) .................................................. 9-198300
Dec. 9, 1997 (JP) .................................................. 9-338489

(51) Int. Cl.$^7$ ........................................................ G11B 7/00
(52) U.S. Cl. ...................... 369/111; 369/275.3; 369/44.13
(58) Field of Search .............................. 369/44.13, 275.2, 369/275.3, 48, 47, 59

(56) References Cited

U.S. PATENT DOCUMENTS

| 5,528,569 | * | 6/1996 | Fujiie et al. | 369/48 |
| 5,539,724 | * | 7/1996 | Ohtomo | 369/44.13 |
| 5,742,578 | * | 4/1998 | Kumai et al. | 369/44.13 |
| 5,754,505 | * | 5/1998 | Saeki | 369/44.26 |
| 5,809,006 | * | 9/1998 | Davis et al. | 369/44.13 |
| 5,820,795 | * | 10/1998 | Takemori et al. | 369/44.13 |
| 5,878,021 | * | 3/1999 | Miyauchi et al. | 369/275.3 |
| 5,926,453 | * | 7/1999 | Muramatsu et al. | 369/275.3 |
| 5,936,933 | * | 8/1999 | Miyamoto et al. | 369/44.13 |
| 5,978,333 | * | 11/1999 | Kobayashi et al. | 369/44.13 |
| 5,999,504 | * | 12/1999 | Aoki | 369/44.13 |
| 6,034,932 | * | 3/2000 | Ishida et al. | 369/54 |
| 6,067,281 | * | 5/2000 | Kobayashi et al. | 369/275.3 |
| 6,069,870 | * | 5/2000 | Maeda et al. | 369/275.3 |
| 6,075,761 | * | 6/2000 | Akiyama et al. | 369/275.3 |

FOREIGN PATENT DOCUMENTS

| 0 327 172 | | 8/1989 | (EP) . | |
| 718831 | * | 6/1996 | (EP) | 369/44.13 |
| 0 800 165 | | 10/1997 | (EP) . | |

OTHER PUBLICATIONS

Satoh et al: "Key Technology for High Density Rewritable DVD (DVD–RAM)" IEEE Transactions on Magnetics, vol. 34, No. 2, Mar. 1998, pp. 337–342, XP002130412.

* cited by examiner

Primary Examiner—Nabil Hindi
(74) Attorney, Agent, or Firm—Frommer Lawrence & Haug, LLP.; William S. Frommer; Dennis M. Smid

(57) ABSTRACT

A novel recording medium capable of realizing high density, reliability in a recording/reproducing operation and facilitating the process which is performed by a drive apparatus is provided.

An amplitude amount of wobbling of a track is made to be 10 nm to 15 nm and a track pitch of the track is made 0.74 $\mu$m to 0.82 $\mu$m. The determined values enable large-capacity recording to be realized and the recording/reproducing performance to be prevented from being deteriorated. As administration information, recommended information for a recording/reproducing operation at an inner peripheral position and an outer peripheral position is recorded. The size of data in a linking section is made to be the same as the sector for constituting a data block.

10 Claims, 35 Drawing Sheets

Disk Format

| Diameter of Disk | 120mm |
|---|---|
| Thickness of Disk | 0.6mm×2 |
| Disk Clamping | Mechanical |
| Case | Option |
| Physical Address | CAV Wobble Groove With FM Data |
| Track Pitch | 0.8$\mu$m |
| Linear Density | 0.35$\mu$m/bit |
| Recording Capacity | 3.0GByte/side |
| Laser Wavelength $\lambda$ | 650nm-5/+15nm |
| NA | 0.6 |
| Modulation Method | 8-16 Modulation[(2,10)RLL] |
| Recording Method | Recording of Mark Edge on Phase-Change Recording Medium |
| Recording Format | CLD(Constant Linear Density) |
| Depth of Groove | $\lambda$/8 |
| Width of Groove | 0.48±0.04$\mu$m |
| Wobble Amplitude | 12.5±2.5nm |

FIG. 1

Disk Format

| | |
|---|---|
| Diameter of Disk | 120mm |
| Thickness of Disk | 0.6mm×2 |
| Disk Clamping | Mechanical |
| Case | Option |
| Physical Address | CAV Wobble Groove With FM Data |
| Track Pitch | 0.8μm |
| Linear Density | 0.35μm/bit |
| Recording Capacity | 3.0GByte/side |
| Laser Wavelength $\lambda$ | 650nm−5/+15nm |
| NA | 0.6 |
| Modulation Method | 8-16 Modulation[(2,10)RLL] |
| Recording Method | Recording of Mark Edge on Phase-Change Recording Medium |
| Recording Format | CLD(Constant Linear Density) |
| Depth of Groove | $\lambda/8$ |
| Width of Groove | 0.48±0.04μm |
| Wobble Amplitude | 12.5±2.5nm |

FIG. 3

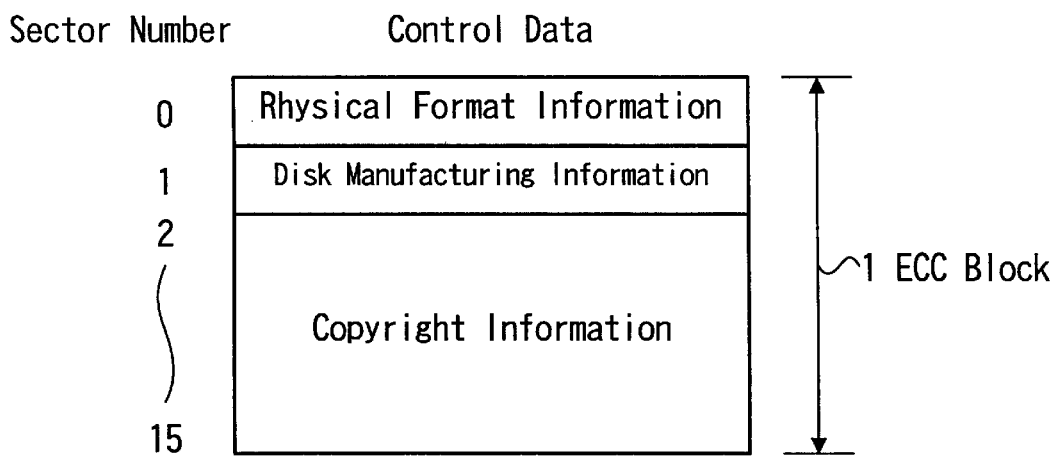

Sector Number | Control Data
0 — Rhysical Format Information
1 — Disk Manufacturing Information
2
(
\
)
15
— Copyright Information 1 ECC Block

FIG. 4

Rhysical Format Information

| Byte Position | Contents | Number of Bytes |
|---|---|---|
| 0 | Book Type/Part Version | 1 |
| 1 | Disk Size/Minimum Read-Out Rate | 1 |
| 2 | Disk Structure | 1 |
| 3 | Recording Density | 1 |
| 4~15 | Data Area Allocation | 12 |
| 16~31 | Reserve (00h) | 16 |
| 32 | Number of Revolutions at CAV | 1 |
| 33~38 | Recommended Information at First Linear Velocity | 6 |
| 39~44 | Recommended Information at Second Linear Velocity | 6 |
| 45~48 | Recommended Information at Third Linear Velocity | 4 |
| 49~2047 | Reserve | 1999 |

First Linear Velocity: Speed at Radial Position of
  24 mm at Rotational Frequency of rf1
Second Linear Velocity: Speed at Radial Position of
  41 mm at Rotational Frequency of rf1
Third Linear Velocity: Speed at Radial Position of
  58 mm at Rotational Frequency of rf1

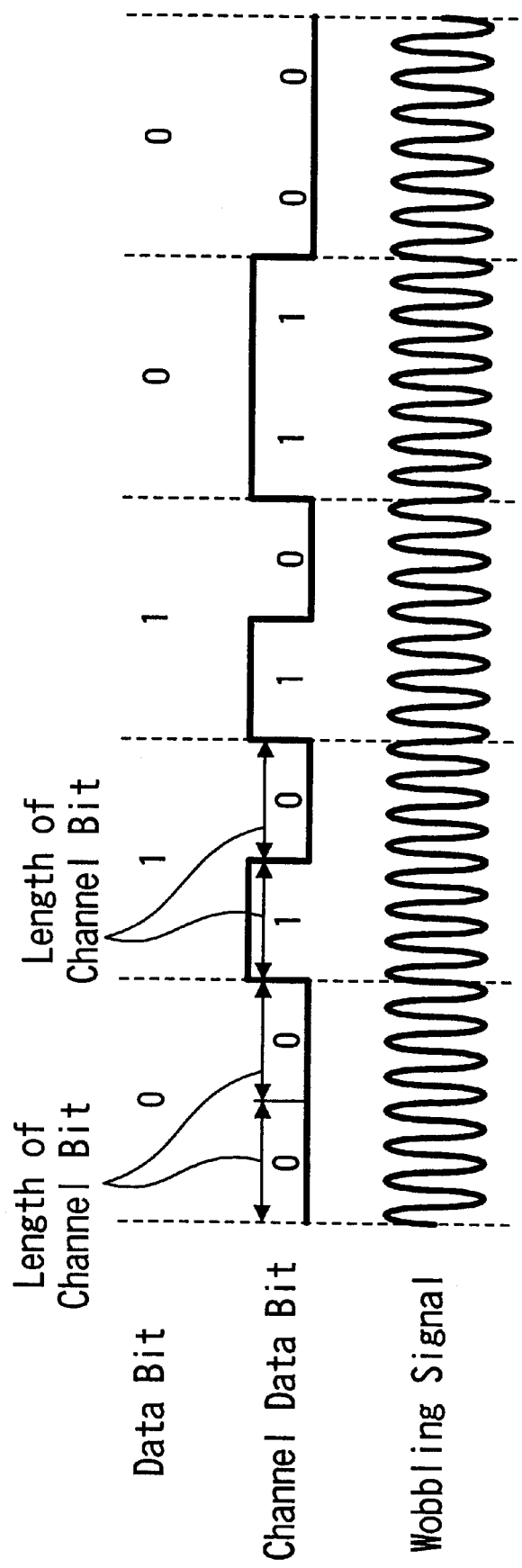

FIG. 27

| | | 1 frame | | | | Linking Point | | | | | | | | Linking Section 13row=26frames =2Kbytes |
|---|---|---|---|---|---|---|---|---|---|---|---|---|---|---|
| 1 | SY0 | all "0" | | | | | SY5 | all "0" | | | | | | all "0" or ALPC&M.F. |
| 2 | SY1 | all "0" or ALPC&M.F. | | | | | SY5 | all "0" | | | | | | |
| 3 | SY2 | all "0" | | | | | SY5 | all "0" | | | | | | |
| 4 | SY3 | all "0" | | | | | SY5 | all "0" | | | | | | |
| 5 | SY4 | all "0" | | | | | SY5 | all "0" | | | | | | |
| 6 | SY1 | all "0" | | | | | SY6 | all "0" | | | | | | |
| 7 | SY2 | all "0" | | | | | SY6 | all "0" | | | | | | |
| 8 | SY3 | all "0" | | | | | SY6 | all "0" | | | | | | |
| 9 | SY4 | all "0" | | | | | SY6 | all "0" | | | | | | |
| 10 | SY1 | all "0" or AUX Data-0 | | | | | SY7 | all "0" or AUX Data-1 | | | | | | |
| 11 | SY2 | all "0" or AUX Data-2 | | | | | SY7 | all "0" or AUX Data-3 | | | | | | |
| 12 | SY3 | all "0" or AUX Data-4 | | | | | SY7 | all "0" or AUX Data-5 | | | | | | |
| 13 | SY4 | all "0" or AUX Data-6 | | | | | SY7 | all "0" or AUX Data-7 | | | | | | |
| | FS | Data | | | | | FS | Data | | | | | | |

FIG. 31

State 1 and 2

|     | (MSB) | | (LSB) | (MSB) | | (LSB) |
| --- | --- | --- | --- | --- | --- | --- |
| SY0= | 0001001001000100 | 0000000000010001 | // | 0001001000000100 | 0000000000010001 |
| SY1= | 0000010010000100 | 0000000000010001 | // | 0000010010000100 | 0000000000010001 |
| SY2= | 0001001000000100 | 0000000000010001 | // | 0001001000010100 | 0000000000010001 |
| SY3= | 0000100000000100 | 0000000000010001 | // | 0001000010000100 | 0000000000010001 |
| SY4= | 0010000000000100 | 0000000000010001 | // | 0010000100010100 | 0000000000010001 |
| SY5= | 0010001001000100 | 0000000000010001 | // | 0010001000000100 | 0000000000010001 |
| SY6= | 0010010000000100 | 0000000000010001 | // | 0010000010000100 | 0000000000010001 |
| SY7= | 0010010001000100 | 0000000000010001 | // | 0010010000000100 | 0000000000010001 |

State 3 and 4

|     | (MSB) | | (LSB) | (MSB) | | (LSB) |
| --- | --- | --- | --- | --- | --- | --- |
| SY0= | 1001001000000100 | 0000000000010001 | // | 1001001001000100 | 0000000000010001 |
| SY1= | 1000010010000100 | 0000000000010001 | // | 1000010010000100 | 0000000000010001 |
| SY2= | 1001000001000100 | 0000000000010001 | // | 1001000000000100 | 0000000000010001 |
| SY3= | 1000010001000100 | 0000000000010001 | // | 1000010000000100 | 0000000000010001 |
| SY4= | 1000100010000100 | 0000000000010001 | // | 1000100000000100 | 0000000000010001 |
| SY5= | 1000100100000100 | 0000000000010001 | // | 1000100100000100 | 0000000000010001 |
| SY6= | 1001000010000100 | 0000000000010001 | // | 1000100001000100 | 0000000000010001 |
| SY7= | 1000010001000100 | 0000000000010001 | // | 1000100010000100 | 0000000000010001 |

FIG. 35

| Zone No. | Radius Position r(μm) | Frame/Track | Track/Zone | ECC Block/Zone | Linear Density (μm/b) | Capacity (byte) | Number of Revolutions (rpm) | Minimum Linear Velocity (m/s) | Maximum Linear Velocity (m/s) |
|---|---|---|---|---|---|---|---|---|---|
| 0 | 24000.0 | 578 | 52.00 | 68 | 0.351 | 2228224 | 1939 | 4.87 | 4.88 |
| 1 | 24041.6 | 579 | 51.91 | 68 | 0.351 | 2228224 | 1939 | 4.88 | 4.89 |
| 2 | 24082.4 | 580 | 52.73 | 68 | 0.351 | 2228224 | 1939 | 4.89 | 4.90 |
| 3 | 24124.0 | 581 | 52.46 | 68 | 0.351 | 2228224 | 1939 | 4.90 | 4.91 |
| 4 | 24165.6 | 582 | 52.10 | 68 | 0.351 | 2228224 | 1939 | 4.91 | 4.92 |
| 5 | 24207.2 | 583 | 52.42 | 69 | 0.351 | 2260992 | 1939 | 4.92 | 4.92 |
| 6 | 24248.8 | 584 | 52.64 | 69 | 0.351 | 2260992 | 1939 | 4.92 | 4.93 |
| 7 | 24290.4 | 585 | 52.77 | 69 | 0.351 | 2260992 | 1939 | 4.93 | 4.94 |
| 8 | 24332.0 | 586 | 52.82 | 69 | 0.351 | 2260992 | 1939 | 4.94 | 4.95 |
| 9 | 24373.6 | 587 | 52.77 | 69 | 0.351 | 2260992 | 1939 | 4.95 | 4.96 |
| 10 | 24415.2 | 588 | 52.64 | 69 | 0.351 | 2260992 | 1939 | 4.96 | 4.97 |
| 11 | 24456.8 | 589 | 52.42 | 69 | 0.351 | 2260992 | 1939 | 4.97 | 4.98 |
| 12 | 24498.4 | 590 | 52.11 | 69 | 0.351 | 2260992 | 1939 | 4.98 | 4.98 |
| 13 | 24540.0 | 591 | 52.46 | 70 | 0.351 | 2293760 | 1939 | 4.98 | 4.99 |
| 14 | 24581.6 | 592 | 52.73 | 70 | 0.351 | 2293760 | 1939 | 4.99 | 5.00 |
| 15 | 24623.2 | 593 | 52.90 | 70 | 0.351 | 2293760 | 1939 | 5.00 | 5.01 |
| 16 | 24664.8 | 594 | 52.99 | 70 | 0.351 | 2293760 | 1939 | 5.01 | 5.02 |
| 17 | 24706.4 | 595 | 52.99 | 70 | 0.351 | 2293760 | 1939 | 5.02 | 5.03 |
| 18 | 24748.0 | 596 | 52.90 | 70 | 0.351 | 2293760 | 1939 | 5.03 | 5.03 |
| 19 | 24789.6 | 597 | 52.73 | 70 | 0.351 | 2293760 | 1939 | 5.03 | 5.04 |
| 20 | 24831.2 | 598 | 52.47 | 70 | 0.351 | 2293760 | 1939 | 5.04 | 5.05 |
| 21 | 24872.8 | 599 | 52.12 | 70 | 0.351 | 2293760 | 1939 | 5.05 | 5.06 |
| 22 | 24914.4 | 600 | 52.42 | 71 | 0.351 | 2326528 | 1939 | 5.06 | 5.07 |
| 23 | 24956.0 | 601 | 52.64 | 71 | 0.351 | 2326528 | 1939 | 5.07 | 5.08 |
| ... | ... | ... | ... | ... | ... | ... | ... | ... | ... |

FIG. 36

| Zone No. | Radius Position r(μm) | Frame/Track | Track/Zone | ECC Block/Zone | Linear Density (μm/b) | Capacity (byte) | Number of Revolutions (rpm) | Minimum Linear Velocity (m/s) | Maximum Linear Velocity (m/s) |
|---|---|---|---|---|---|---|---|---|---|
| ... | ... | ... | ... | ... | ... | ... | ... | ... | ... |
| 796 | 57112.8 | 1374 | 52.68 | 162 | 0.351 | 5308416 | 1001 | 5.99 | 5.99 |
| 797 | 57154.4 | 1375 | 51.75 | 162 | 0.351 | 5308416 | 1001 | 5.99 | 5.99 |
| 798 | 57196.0 | 1376 | 52.79 | 162 | 0.351 | 5308416 | 1001 | 5.99 | 6.00 |
| 799 | 57237.6 | 1377 | 52.79 | 162 | 0.351 | 5308416 | 1001 | 6.00 | 6.00 |
| 800 | 57279.2 | 1378 | 52.75 | 162 | 0.351 | 5308416 | 1001 | 6.00 | 6.01 |
| 801 | 57320.8 | 1379 | 52.68 | 162 | 0.351 | 5308416 | 1001 | 6.01 | 6.02 |
| 802 | 57362.4 | 1380 | 52.57 | 162 | 0.351 | 5308416 | 1001 | 6.01 | 6.02 |
| 803 | 57404.0 | 1381 | 52.41 | 162 | 0.351 | 5308416 | 1001 | 6.02 | 6.02 |
| 804 | 57445.6 | 1382 | 52.55 | 163 | 0.351 | 5341184 | 1001 | 6.02 | 6.03 |
| 805 | 57487.2 | 1383 | 52.64 | 163 | 0.351 | 5341184 | 1001 | 6.02 | 6.03 |
| 806 | 57528.8 | 1384 | 52.70 | 163 | 0.351 | 5341184 | 1001 | 6.03 | 6.03 |
| 807 | 57570.4 | 1385 | 52.72 | 163 | 0.351 | 5341184 | 1001 | 6.03 | 6.04 |
| 808 | 57612.0 | 1386 | 52.70 | 163 | 0.351 | 5341184 | 1001 | 6.04 | 6.04 |
| 809 | 57653.6 | 1387 | 52.64 | 163 | 0.351 | 5341184 | 1001 | 6.04 | 6.05 |
| 810 | 57695.2 | 1388 | 52.55 | 163 | 0.351 | 5341184 | 1001 | 6.05 | 6.05 |
| 811 | 57736.8 | 1389 | 52.42 | 163 | 0.351 | 5341184 | 1001 | 6.05 | 6.06 |
| 812 | 57778.4 | 1390 | 52.57 | 164 | 0.351 | 5373952 | 1001 | 6.06 | 6.06 |
| 813 | 57820.0 | 1391 | 52.68 | 164 | 0.351 | 5373952 | 1001 | 6.06 | 6.06 |
| 814 | 57861.6 | 1392 | 52.75 | 164 | 0.351 | 5373952 | 1001 | 6.06 | 6.07 |
|  | 57903.2 |  | 42900 | 94444 |  | 3.09E+09 |  |  |  |

Track pitch 0.8um

FIG. 39

| Zone No. | Block No. | Sector No. | Frame No. /Zone | Track No. | Frame No. /Track |
|---|---|---|---|---|---|
| 0 | 0 | 0 | 0 | 0 | 0 |
| 0 | 1 | 16 | 442 | 0 | 442 |
| 0 | 2 | 32 | 884 | 1 | 306 |
| 0 | 3 | 48 | 1326 | 2 | 170 |
| 0 | 4 | 64 | 1768 | 3 | 34 |
| 0 | 5 | 80 | 2210 | 3 | 476 |
| ⋮ | ⋮ | ⋮ | ⋮ | ⋮ | ⋮ |
| 0 | 66 | 1056 | 29172 | 50 | 272 |
| 0 | 67 | 1072 | 29614 | 51 | 136 |
| 1 | 0 | 1088 | 0 | 52 | 0 |
| 1 | 1 | 1104 | 442 | 52 | 442 |
| 1 | 2 | 1120 | 884 | 53 | 305 |
| 1 | 3 | 1136 | 1326 | 54 | 168 |
| 1 | 4 | 1152 | 1768 | 55 | 310 |
| 1 | 5 | 1168 | 2210 | 55 | 473 |
| ⋮ | ⋮ | ⋮ | ⋮ | ⋮ | ⋮ |
| 1 | 66 | 2144 | 29172 | 102 | 222 |
| 1 | 67 | 2160 | 29614 | 103 | 85 |
| 2 | 0 | 2176 | 0 | 103 | 527 |
| 2 | 1 | 2192 | 442 | 104 | 389.9 |
| 2 | 2 | 2208 | 884 | 105 | 251.9 |
| 2 | 3 | 2224 | 1326 | 106 | 113.9 |
| 2 | 4 | 2240 | 1768 | 106 | 555.9 |
| ⋮ | ⋮ | ⋮ | ⋮ | ⋮ | ⋮ |
| 813 | 162 | 1705056 | 71604 | 44327 | 58.1 |
| 813 | 163 | 1705072 | 72046 | 42327 | 500.1 |
| 814 | 0 | 1705088 | 0 | 42327 | 942.1 |
| 814 | 1 | 1705104 | 442 | 42327 | 1384.8 |
| 814 | 2 | 1705120 | 884 | 42328 | 434.8 |
| 814 | 3 | 1705136 | 1326 | 42328 | 876.8 |
| 814 | 4 | 1705152 | 1768 | 42328 | 1318.8 |
| 814 | 5 | 1705168 | 2210 | 42328 | 368.8 |
| ⋮ | ⋮ | ⋮ | ⋮ | ⋮ | ⋮ |
| 814 | 162 | 1707680 | 71604 | 42379 | 162.8 |
| 814 | 163 | 1707696 | 72046 | 42379 | 604.8 |

OPTICAL RECORDING MEDIUM AND RECORDING METHOD THEREOF

BACKGROUND OF THE INVENTION

1. Field of the Invention

The present invention relates to an optical recording medium, such as an optical disk or the like and a recording method thereof and more particularly to an optical disk on which address information is recorded by wobbling a pre-groove.

2. Description of the Related Art

To record data on a disk, address information must be recorded to enable data to be recorded at a predetermined position. The address information is sometimes recorded by wobbling.

An example of the method to record the above-mentioned wobbling information on a track of a disk is disclosed in the U.S. Pat. No. 4,942,565.

That is, a track on which data is recorded is in the form of a pre-groove which is previously formed. The side wall of the pre-groove is wobbled (allowed to meander) is response to the address information.

Thus, the address can be read from the wobbling information. Therefore, even if bit data or the like indicating the address is not previously formed on the track, data can be recorded or reproduced to and from a required position.

The foregoing optical recording medium is required to have a large capacity while maintaining reliability of a recording/reproducing operation. Therefore, suggestion of an appropriate recording density has been required.

Moreover, it is preferred to realize such a matter that the process which is performed by a recording/reproducing apparatus can be performed easily, and also that compatibility with a disk of another type in terms of a medium and an apparatus is required.

For example, a disk called a "DVD-ROM (Digital versatile Disc ROM/Digital Video Disc ROM) has been developed as a preferred optical disk for use in the multimedia. A rewritable recording medium having compatibility with the DVD-ROM and which does not complicate recording/reproducing apparatus is required.

As a matter of course, the disk itself must have a function for determining the type of the disk in consideration a of the compatibility.

SUMMARY OF THE INVENTION

An object of the present invention is to solve the above-mentioned problems and provide a novel optical recording medium and the recording method thereof.

To th is end, according to the present invention, an optical recording medium is provided in which a track on which data is recorded is previously formed and the track is wobbled with a signal obtained by frequency-modulating a carrier having a predetermined frequency in correspondence with address information, wherein an amount of an amplitude of wobbling of the track is made to be a value within a range from 10 nm to 15 nm and a track pitch of the track is made to be a value within a range from 0.74 $\mu$m to 0.82 $\mu$m.

The above-mentioned values enable a predetermined data recording capacity on the optical recording medium under a condition of a predetermined NA and wavelength of laser. Moreover, the relationship between the amount of the amplitude of wobbling and the track pitch is made to be a value with which a satisfactory reproduction error rate of address information and reproduction information can be obtained.

The track on which data is recorded is previously formed, the track is wobbled with a signal obtained by frequency-modulating a carrier having a predetermined frequency in accordance with address information,and the wobbling serving as address information is formed in correspondence with rotations having a constant angular velocity. Information which enables the type of a recording medium to be identified is recorded as administration information.

The optical recording medium has a structure that zoning of the track is set such that data can be recorded at a substantially constant linear density, an area on which administration information of the optical recording medium is recorded is formed at a predetermined position on the optical recording medium and recommended information for a recording/reproducing operation at least at an internal position and an external position is recorded as administration information.

As administration information, values of a track pitch and a central linear density are recorded or information which enables the track pitch and the central linear density to be distinguished is recorded.

That is, the recording/reproducing apparatus is enabled to recognize a preferred recording/reproducing condition with respect to the optical recording medium and identify the physical properties of the optical recording medium.

An optical recording medium in which a track on which data is recorded is formed previously, and the track is wobbled with a signal obtained by frequency-modulating a carrier having a predetermined frequency in response to address information is provided, wherein recording is performed in such a manner that a linking section is formed between a data block serving as a data recording unit on the track and an adjacent data block, and the data size of the linking section is made to be the same as a minimum data unit for constituting the data block.

As a result, a process for a linking section required to constitute a rewritable structure can be facilitated.

[C] Logical Format of Optical Disk
    C-1: Sector Format
    C-2: Linking Section
    C-3: Frame Synchronizing Signal
    C-4: Reason of Setting Linking Section
[D] Zoning Format
[E] Recording/Reproducing Apparatus

BRIEF DESCRIPTION OF THE DRAWINGS

FIG. 1 is an explanatory diagram showing a disk format according to an embodiment of the present invention.

FIG. 3 is an explanatory diagram showing control data for the disk according to the embodiment.

FIG. 4 is an explanatory diagram showing physical format information of control data for the disk according to the embodiment.

FIG. 20 is an explanatory diagram showing frequency modulation in the wobbling signal generating circuit with respect to the disk according to the embodiment.

FIG. 27 is an explanatory diagram showing the data structure in the linking section according to the embodiment.

FIG. 31 is an explanatory diagram showing a synchronizing signal pattern according to the embodiment.

FIG. 35 is an explanatory diagram showing the zoning format of the disk according to the embodiment.

FIG. 36 is an explanatory diagram showing the zoning format of the disk according to the embodiment.

FIG. 39 is an explanatory diagram showing the contents of a ROM table of the recording/reproducing apparatus according to the embodiment.

DESCRIPTION OF THE REFERRED EMBODIMENTS

Figure 2:
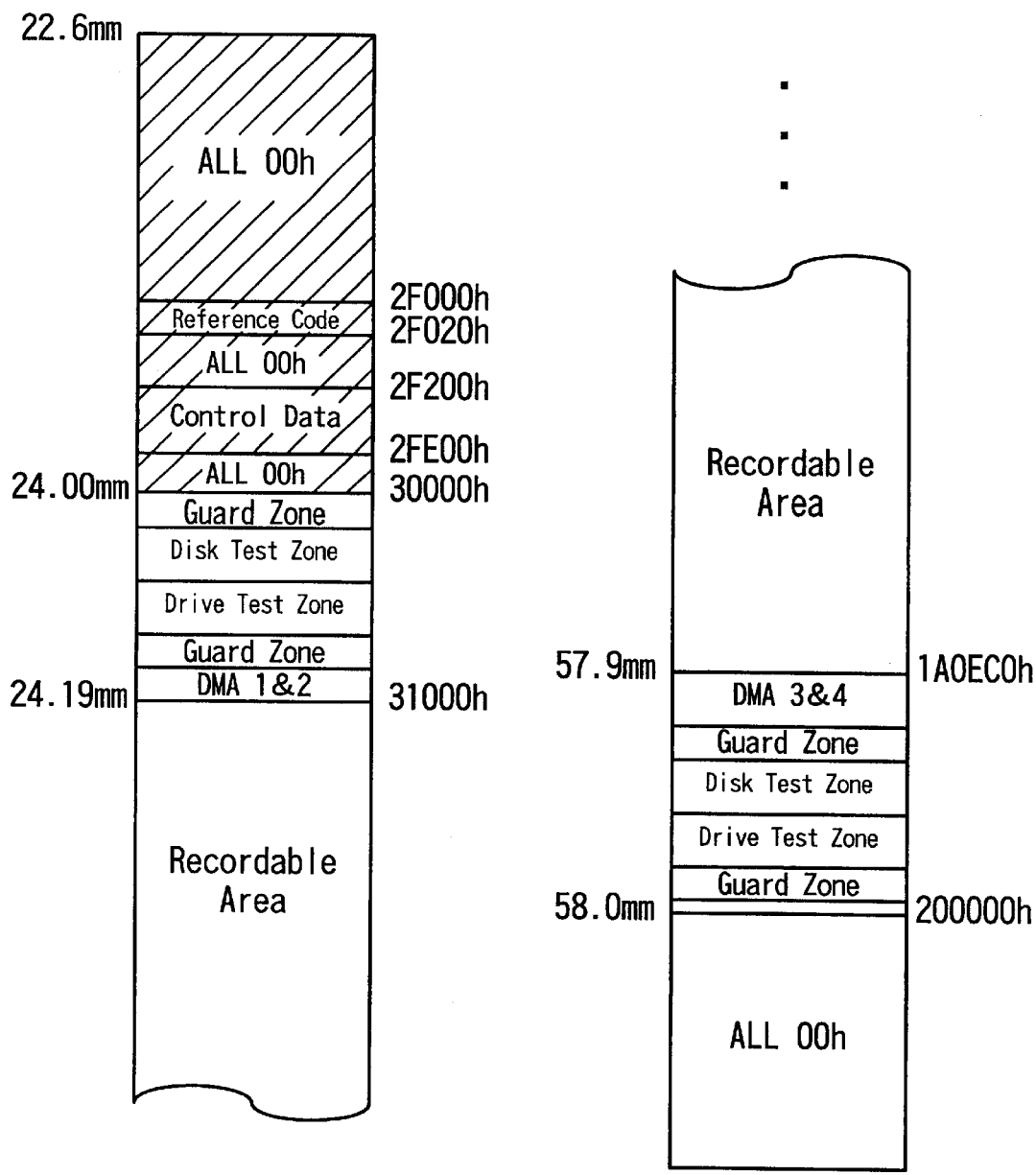
FIG. 2 is an explanatory diagram showing the area structure of the disk according to this embodiment.

An optical disk, a cutting apparatus for cutting the optical disk and a recording/reproducing apparatus according to an embodiment of the present invention will now be described as follows:

[A] Physical Format of Optical Disk
   A-1: Disk Format
   A-2: Control Data
   A-3: Wobble Address Format
   A-4: Reason of Setting Physical Format
[B] Cutting Apparatus
[C] Logical Format of Optical Disk
   C-1: Sector Format
   C-2: Linking Section
   C-3: Frame Synchronizing Signal
   C-4: Reason of Setting Linking Section
[D] Zoning Format
[E] Recording/Reproducing Apparatus
[A] Physical Format of Optical Disk
   A-1: Disk Format The optical disk according to this embodiment is an optical disk on which data is recorded by a phase change method. The physical format of the optical disk according to this embodiment is structured as shown in FIG. 1.

As the disk size, the diameter of the disk is 120 mm. The disk has a structure constituted by laminating two plates each having a disk thickness (a sub-straight) of 0.6 mm. Thus, the overall disk thickness is 1.2 mm. A mechanical disk clamping method is employed. That is, the shape of the disk according to this embodiment is similar to that of a CD (Compact Disc) or a DVD-ROM (Digital versatile Disc-ROM/Digital video Disc-ROM)and so in appearance.

Moreover, a case which can be used when loading into a recording/reproducing apparatus is performed and which accommodates and holds the disk is prepared as an option.

On the disk there is formed previously a track by a groove (recess). The groove is wobbled (allowed to meander) so that a physical address is expressed. As described later, the groove is wobbled with a signal obtained by frequency-modulating the addresses so that information reproduced from the groove is frequency-demodulated. Thus, an absolute address can be extracted.

The disk is rotated by a CAV (Constant Angular Velocity) method. Therefore, the absolute address included in the groove is CAV data.

The depth of the groove is λ/8 which is the wavelength of a recording/reproducing laser beam, the width of the groove is about 0.48 mm and the wobbling amplitude is about 12.5 nm.

The wavelength of the laser beam satisfies λ=650 nm (−5/+15 nm). The numerical aperture of an optical head of the recording/reproducing apparatus satisfies NA=0.6.

The optical disk according to this embodiment employs a groove recording method (land is not used to perform a recording operation). The length from the center of a groove to the center of an adjacent groove in the widthwise direction of the track is the track pitch. The track pitch is set to be 0.80 µm.

The operation for recording data is performed by a CLD (Constant Linear Density) method. The linear density is set to be 0.35 µm/bit.

A certain width is set as a range for the linear density. In actual, a multiplicity of zoning settings are performed so that the overall disk is brought to a state near the constant linear density. As described later, the foregoing state is called a zone CLD (Zoned Constant Linear Density).

A recordable area, on which data can be recorded, is formed on the disk having the diameter of 120 mm as described later and the zoned CLD is employed so that a track pitch of 0.80 µm realizes a recording capacity of 3.0 Gbyte on one side (one of recording layers).

As a method of modulating data to be recorded, 8–16 modulation is employed similarly to the so-called DVD so that mark-edge recording of data on the phase change recording medium is performed.

FIG. 2 shows the area structure from the inner periphery side (lead-in) to the outer periphery side (lead-out) of the disk. The left-hand portion of the foregoing structural view has the positions in the radial direction of the disk, while the right-hand side has the values of absolute addresses expressed by hexadecimal notation.

The innermost peripheral side (from radial positions 22.6 mm to 24.0 mm) having diagonal lines is set to an area on which emboss pits are recorded.

In the foregoing emboss area, reference codes for 2 ECC blocks (hereinafter simply called "blocks") are recorded from an absolute address "2F200h" in addition to data of all "00h". Moreover, control data for 192 blocks are recorded from a position corresponding to the absolute address "2F200h".

The block (the ECC block) is a unit for constituting an error correction block and has a structure in which an error correction code is added for each 32 kbyte data.

The foregoing control data and the reference codes are recorded when a cutting process is performed for manufacturing a master disc so as to be pit data for only reading. The control data includes physical administration information of the optical disk and so on.

A region from a radial position of 24.0 mm to the outermost periphery, that is, a region except for the emboss area is a recordable region (a groove area) on which a track is formed by a groove. Note that a portion outer than a radial position of 58.0 mm is a portion in which only a groove is formed.

A recordable area permitted for a user to record data is a region from a radial position of 24.19 mm to 57.9 mm. The recordable area is an area from an absolute address of 31000h to 1A0EBFh.

In the portions inner than the recordable area and outer than the same, a guard zone, a disk test zone, a drive test zone and a DMA (Defect Management Area) are formed.

The guard zone is provided as an area in which synchronization of a write clock is performed when data is written on the disk test zone or the DMA.

The disk test zone is provided for checking the disk condition.

The drive test zone is provided for checking a state of a recording/reproducing drive.

The DMA is composed of DMA 1 and DMA 2 formed in the inner periphery side of the disk and DMA 3 and DMA 4 formed in the outer periphery side of the disk. DMA 1 to DMA 4 have the same contents recorded thereon.

In the DMA recorded are a result of detection of a defect in the recordable area and information of alternating sector. When the recording/reproducing operation is performed by making a reference to the contents of the DMA, recording/reproducing can be performed such that a defective region is avoided.

A-2: Control Data

The contents of control data which is recorded in the emboss area as reproduction-only data as described above are shown in FIG. 3.

Each of 192 blocks forming control data includes 16 sensors (1 sector=2048 bytes: the sector format will be described later). The 16 sectors are used as shown in FIG. 3.

That is, information about the physical format of the disk is recorded in the first sector having a sector number 0.

In a sector having a sector number 1, manufacturing information of the disk is recorded. The foregoing information is text data and code data which can be recorded by a manufacturer of the disk in a free format manner.

In sectors having sector numbers 2 to 15, a variety of copy right informations are recorded.

The contents of information of the physical format which is recorded in the sector having the sector number 0 are shown in FIG. 4 together with the byte position and the number of bytes in the sector.

The book type and part version are recorded at a byte position 0.

As the book type, four-bit data is employed to record the type of the disk, for example, a read-only type disk, rewritable disk or the like.

As the part version, four-bit version information is recorded.

At a byte position 1, each four-bit data is used to record the disk size and the minimum read-out rate. The disk size is information of the type of the disk, that is, an 8-cm disk, a 12-cm disk or another disk.

At a byte position 2, the structure of the disk is recorded. At the foregoing position, the following information is recorded: the number of layers, that is, the disk has a single layer structure or a dual layer structure, whether the type of the track is the parallel track path or a opposite track path, whether or not the type of the layer includes the emboss user data area, recordable user data area and rewritable user data area or the like.

At a byte position 3, information about the recording density is recorded which includes four-bit information of the linear density and the track density (the track pitch) each.

The disk according to this embodiment has the linear density of 0.35 µm/bit and a track pitch of 0.80 µm recorded thereon.

Twelve bytes from byte positions 4 to 15 are used as a data area allocation, while sixteen bytes from byte positions 16 to 31 are used as a reserve.

At a byte position 32, the value of the CAV revolution number is recorded.

Six bytes from byte positions 33 to 38, six bytes from byte positions 39 to 44 and four bytes from byte positions 45 to 48 are areas on which recommended informations at a first linear velocity, a second linear velocity and a third linear velocity are recorded, respectively.

The first linear velocity is a linear velocity at a radial position of 24 mm at a predetermined revolution number of CAV. Since the rotation of the disk is performed at the CAV, the linear velocity varies depending on the radial position. In other words, the radial position determines the linear velocity. The first linear velocity which is a linear velocity at the radial position of 24 mm means a linear velocity at the leading end of the recordable area shown in FIG. 2.

The second linear velocity is a linear velocity at radial position of 41 mm at a predetermined revolution number of the CAV, that is, a linear velocity at substantially the intermediate position in the recordable area. Further, the third linear velocity is a linear velocity at radial position of 58 mm at a predetermined revolution number of the CAV, that is, a linear velocity at the outermost periphyal position of a region having effective data in the groove area.

As recommended information, recommended value of each of the peak power, the bias power and the lead power of the laser beam at each radial position (the linear velocity) is recorded.

Since the disk according to this embodiment is rotated at the CAV, the linear velocity is raised toward the outer peripheral side of the disk. To realize the CLD (Constant Linear Velocity) recording method under such a state, the frequency of the recording clock is changed in correspondence with the radial position (which is a zone to be described later).

Since the above-mentioned method is employed, the optimum value of the recording/reproducing laser power varies between the inner periphery and the outer periphery. In actual, the optimum value is substantially linearly changed. As recommended values at the first, second and third linear velocities, minimum, intermediate and maximum vales are indicated as guides.

An area of 1999 bytes from byte position 49 to 2047 is made to be a reserve area.

Physical format information in the control data indicates the type and the physical properties of the disk. The recording/reproducing apparatus reads the foregoing information so that the recording/reproducing apparatus is able to use the disk to appropriately perform a recording/reproducing operation.

A-3: Wobble Address Format

The disk according to this embodiment has groove areas except for the emboss area, the groove areas having tracks which are previously formed by wobbling grooves. The wobbling grooves express the absolute addresses. Therefore, the recording/reproducing apparatus is able to obtain information including the absolute address or the like by extracting signals corresponding to the state of wobbles of the grooves when the disk is driven.

Figure 5A:
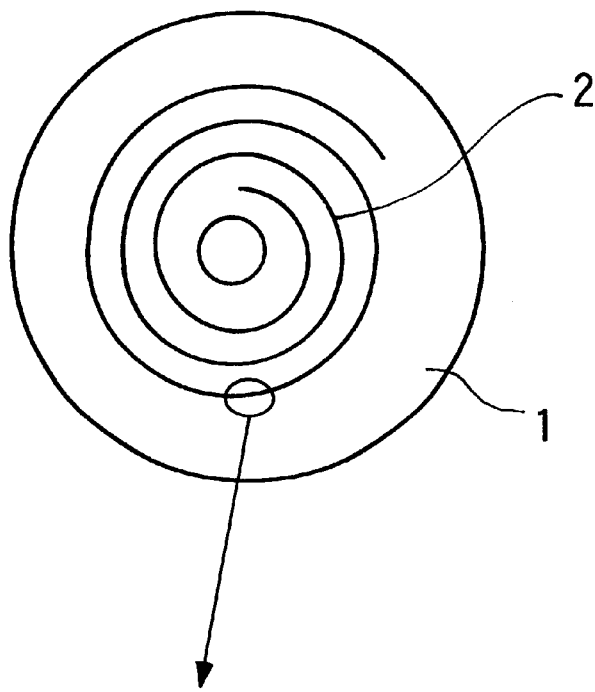
FIG. 5 is an explanatory diagram showing a wobbling pre-groove of the disk according to the embodiment.
Figure 5B:
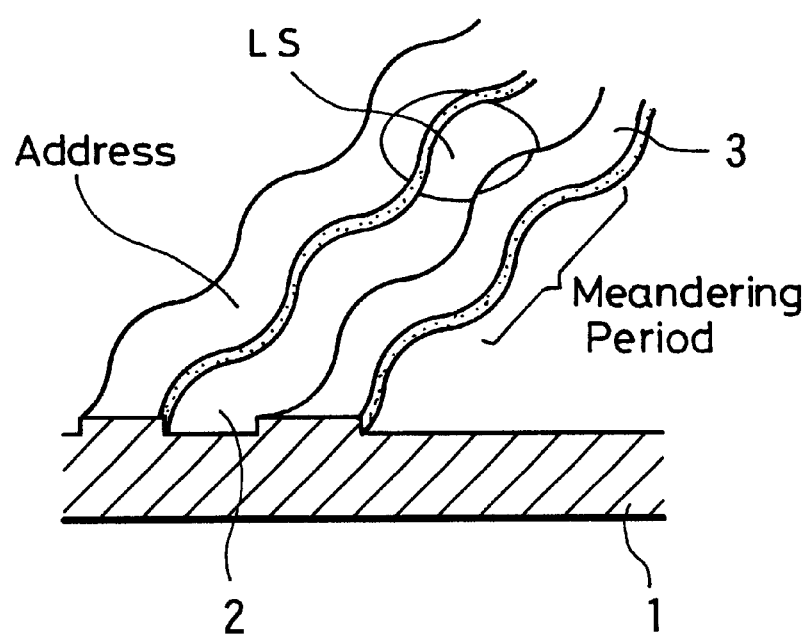

FIG. 5 shows an example of the structure of the groove of the optical disk according to this embodiment. As schematically shown in FIG. 5(*a*), a spiral pre-groove 2 is previously formed in a groove area of in a disk 1 according to this embodiment in a direction from its inner periphery towards its outer periphery in the form of a spiral. As a matter of course, the pre-groove 2 may be formed into a concentric configuration.

As shown in FIG. 5(*b*), which is a partially-enlarged view thereof, the right and left side walls of the pre-groove 2 are wobbled in accordance with address information. That is, as will be described later, the side walls are allowed to meander at a predetermined cycle corresponding to a wobbling signal generated in accordance with the addresses. The portion between the adjacent grooves 2 is formed into a land 3. Data is recorded in the grooves 2.

Figure 6A:
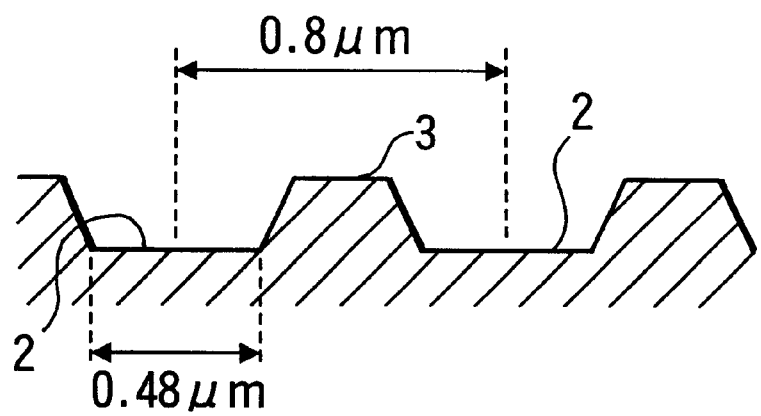
FIG. 6 is an explanatory graph showing a groove width and a wobble amplitude of the disk according to the embodiment.
Figure 6B:
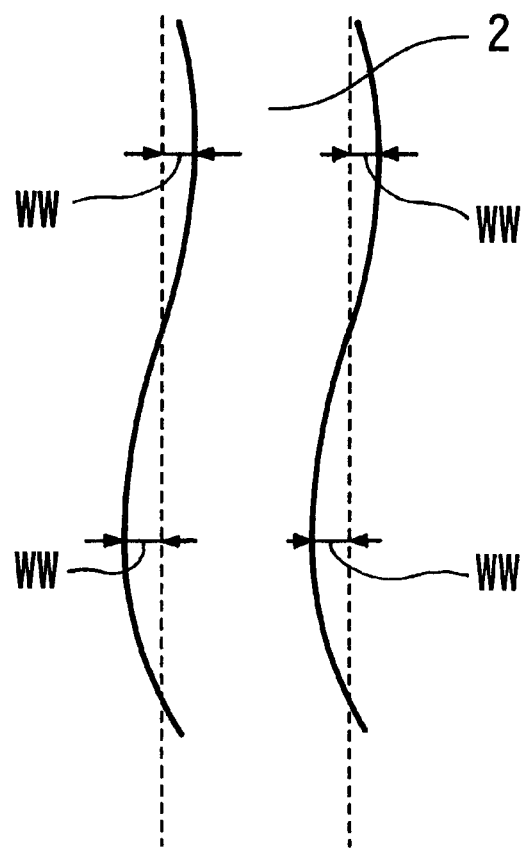

Therefore, the track pitch is the distance from the center of groove 2 to the center of its adjacent groove 2. As shown in FIG. 6(*a*), the track pitch is made to be 0.8 $\mu$m. The width of the groove (the width of the bottom portion of the groove 2) is made to be 0.48 $\mu$m. Therefore, the width of the groove 2 is larger than that of the land 3.

As shown in FIG. 5(*b*), the groove 2 is allowed to meander. The amount of meandering (wobbling) is defined as a value of a wobble amplitude WW shown in FIG. 6(*b*).

The disk 1 according to this embodiment has a structure that the wobble amplitude WW is 12.5 nm. The amount of wobbling of the groove is instantaneously enlarged at a certain cycle of interval, the enlarged amount of wobbling being a fine clock mark to be described later. The wobble amplitude in the foregoing portion is, for example, about 25 nm to about 30 nm.

One track (one round of the track) has a plurality of wobbling address frames.

Figure 7:
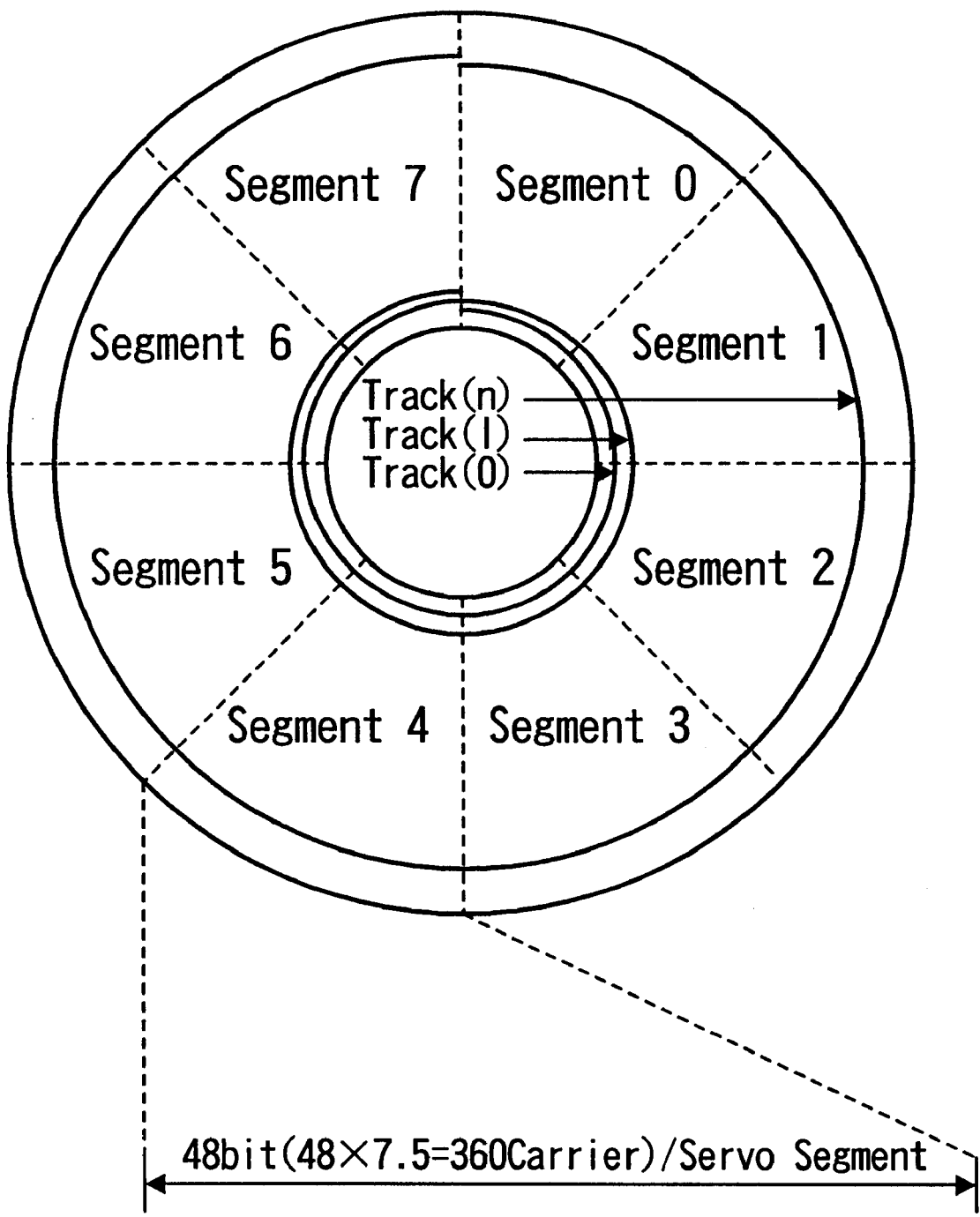
FIG. 7 is an explanatory diagram showing a CAV format of the wobbling address of the disk according to the embodiment.

The wobbling address frame is, as shown in FIG. 7, sectioned into eight sections in a direction in which the disk is rotated, each section being a servo segment (segment 0 to segment 7).

One servo segment (hereinafter simply called a segment) includes 48-bit information mainly constituted by the absolute address. Wobbling per each segment has 360 waves.

In each wobbling address frame serving as each segment (segment 0 to segment 7), a wobble groove is formed because the 48-bit wobble data is FM modulated.

The above-mentioned fine clock marks are formed on the wobbling groove at the same interval so as to be used when a reference clock is generated by a PLL circuit when an operation for recording data is performed. Ninety six fine clock marks per rotation of the disk are formed. Therefore, 12 fine clock marks are formed per segment.

Figure 9:
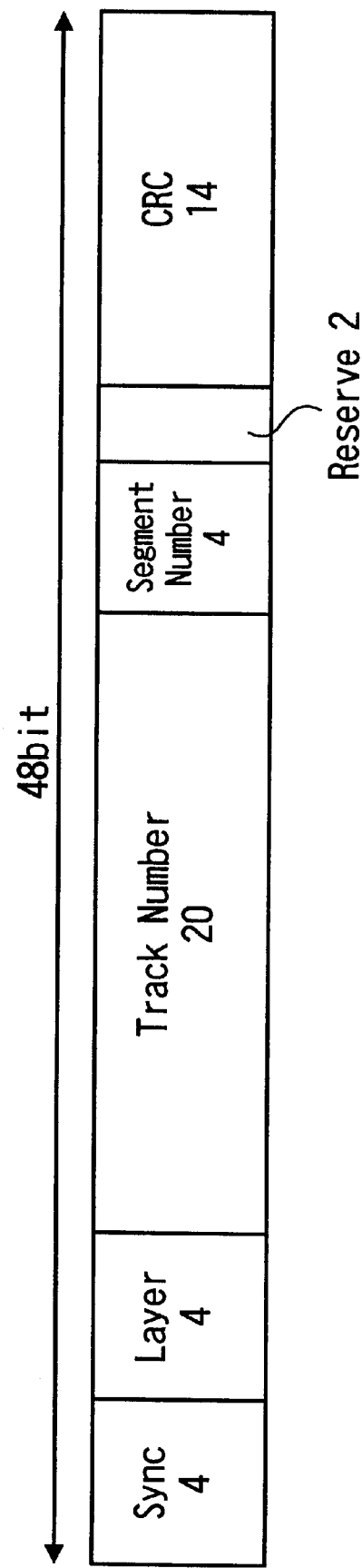
FIG. 9 is an explanatory diagram showing the frame structure of the wobbling address of the disk according to the embodiment.

Each wobbling address frame serving as each segment (segment 0 to segment 7) has a structure shown in FIG. 9.

In the 48-bit wobbling address frame, first four bits are composed of a synchronizing signal (Sync) indicating the start of the wobbling address frame. The four-bit synchronizing pattern is bi-phase data which forms 4-bit data with an 8-channel bit.

The following four bits form layer information (Layer) indicating any layer among a plurality of recording layers or the layer structure of the disk.

The following twenty bits form the track address (the track number) which is the absolute address on the disk.

The following four bits indicate the segment number. The values of the segment numbers are "0" to "7" corresponding to the segment 0 to the segment 7. That is, the segment number is a value indicating the position for the circumferential direction of the disk.

The following two bits are used as a reserve. In fourteen bits in the final portion of the wobbling address frame, an error detection code (CRC) is formed.

As described above, the fine clock marks are formed at the same interval on the wobbling address frame.

Figure 8:
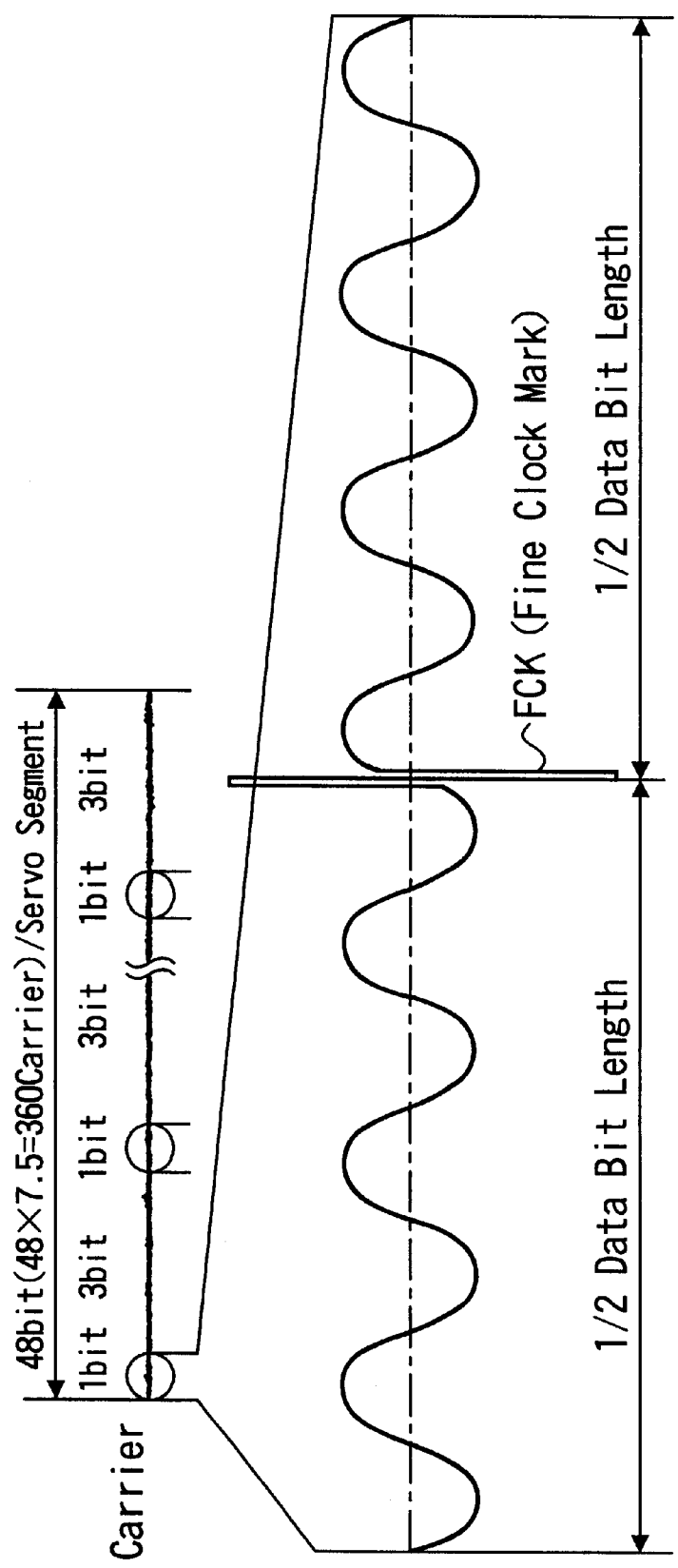
FIG. 8 is an explanatory diagram showing a segment of an wobbling address of the disk according to the embodiment.

FIG. 8 shows a state of the fine clock mark. In each wobbling address frame, 48-bit data is recorded. One bit is, as shown in FIG. 8, expressed by seven waves (carriers) among signals having a predetermined frequency. In one frame, 360 waves exist.

Assuming that the optical disk 1 is rotated 1939 times per minute, the frequency of the carrier is 93.1 KHz.

As shown in FIG. 8, in the wobbling address frame shown in FIG. 9, one bit is allocated for each four bits of address information for the fine clock mark. That is, the fine clock mark is superimposed on one bit of four bits which constitute one cycle.

First one bit in the unit composed of four bits is a bit including the fine clock mark. The residual three bits are bits which do not include the fine clock mark. An enlarged shape of the bit including the fine clock mark is shown in a lower portion of FIG. 8. As shown in the figure, a waveform serving as a fine clock mark FCK is included at the central position of the data bit length.

The shape of meandering of the groove 2 on the disk 1 is formed such that the wobble amplitude WW of the portion corresponding to the fine clock mark FCK is instantaneously enlarged to, for example, about 30 nm.

In one frame, 12 fine clock marks are recorded at intervals of three bits. Therefore, 96 (=12×8) fine clock marks are recorded in one rotation (one track).

The fine clock mark (a PLL clock which is generated from the fine clock mark in the recording/reproducing apparatus) can be made to be information indicating the circumferential position more precisely than the segment number.

The frequency of the carrier of each of 48-bit data is a value corresponding to each data. Each data of, for example, the track number or the like, is bi-phase-modulated, and then frequency-modulated. The pre-groove is wobbled with the wave, the frequency of which has been modulated.

A-4: Reason for Setting of Physical Format

The physical format of the disk according to this embodiment is set as described above. The reason why the foregoing format is set as described above and an obtainable effect thereby will now be described.

The reason why the track pitch is 0.8 $\mu$m, the linear density is 0.35 $\mu$m/bit and the wobble amplitude WW is 12.5 nm will now be described.

Initially, the values that the wavelength of the laser beam satisfies $\lambda$=650 nm and NA=0.6 as shown in FIG. 1 are considered. Moreover, an assumption is made that a recording capacity of 3 Gbytes is realized in a disk having a diameter of 120 mm.

Thus, a calculation is performed so that a fact is found that a track pitch of about 0.8 $\mu$m is required to realize 3 Gbyte.

A preferred linear density is considered when a CLD recording operation is performed in a state in which an assumption is made that the track pitch is 0.8 $\mu$m.

Figure 10:
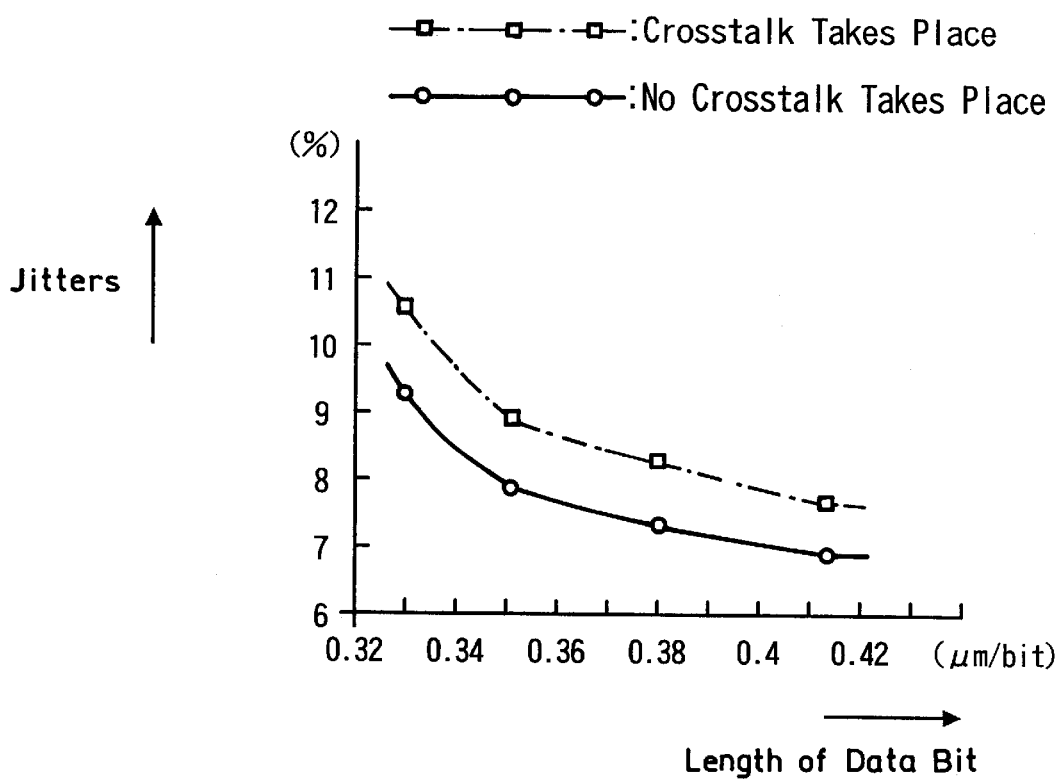
FIG. 10 is an explanatory graph showing the relationship between a jitter and the length of a data bit for setting the disk format according to the embodiment.

FIG. 10 shows a result of measurement of jitters of reproduced data at various linear densities in a state in which the track pitch is 0.8 $\mu$m.

A solid-line curve shows a result in a case where no crosstalk takes place, while one-dot-claim line curve shows a result in a case where crosstalk takes place. The state in which crosstalk takes place is a state in which data is previously recorded on a track adjacent to a track which must be inspected. Therefore, data reproduced from the track which must be inspected contains a certain amount of crosstalk component. The state in which no crosstalk takes place is a state in which data is not recorded on the track adjacent to the track which must be inspected. Therefore, data reproduced from the track which must be inspected does not contain any crosstalk component.

As can be understood from the foregoing figure, jitters do not increase/decrease rapidly in a direction toward low densities from a boundary which is about a linear density of 0.35 $\mu$m/bit. In a portion in which the linear density exceeds 0.35 $\mu$m/bit, jitters tend to rapidly increase. That is, a region of the linear density to about 0.35 $\mu$m/bit is a preferred region in view of the jitters. Since the density is as raised as possible, the linear density of 0.35 $\mu$m/bit is set in this embodiment.

Then, an amount of the wobble amplitude is considered in a state in which the track pitch is 0.8 $\mu$m and the linear density is 0.35 $\mu$m/bit.

Figure 11:
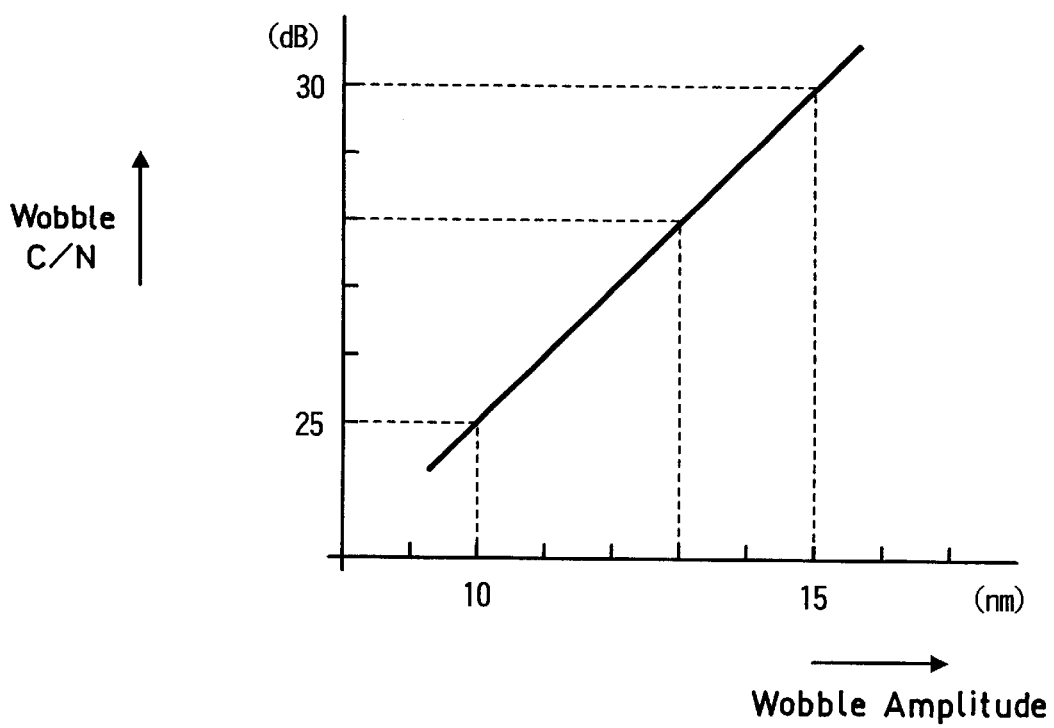
FIG. 11 is an explanatory graph showing the relationship between the C/N of the wobble and the wobble amplitude for setting the disk format according to the embodiment.

FIG. 11 shows the relationship between the C/N (Carrier/Noise ratio) of the wobble and the amount of the wobble amplitude.

As can be understood from this figure, the C/N is improved in proportion to the amount of the wobble amplitude. That is, in proportion to the amount of the wobble amplitude, the error rate in decoding the absolute address is improved. In proportion to the amount of the wobble amplitude, the C/N deteriorates. Thus, the address error rate deteriorates.

If the C/N is made to be 23 dB or lower, the address error is made to be a value more than an allowable value. Therefore, the amount of the wobble amplitude must be 10 nm or larger.

Figure 12:
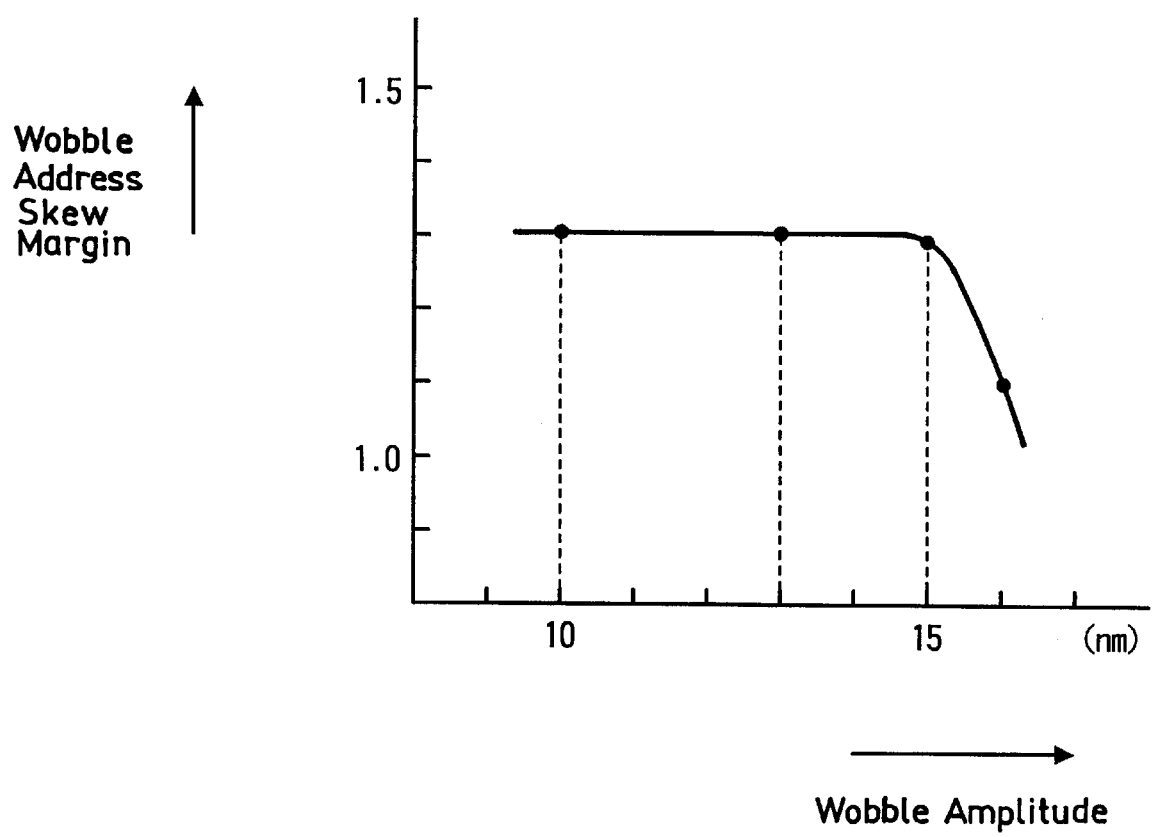
FIG. 12 is an explanatory graph showing the relationship between a wobble address skew margin and the wobble amplitude for setting the disk format according to the embodiment.

On the other hand, FIG. 12 shows the relationship between the skew margin of the wobble address and the amount of the wobble amplitude. That is, a limit with which the address can satisfactorily be decoded with respect to a state of inclination of the disk is shown. It is preferable that the skew margin is large.

As can be understood from this figure the skew margin deteriorates when the amount of the wobble amplitude exceeds 15 nm.

As a result of the above inspection, a preferred amount of the wobble amplitude is 10 nm to 15 nm. In this embodiment, the wobble amplitude WW is made to be 12.5 nm which is included in the above-mentioned range.

When the amount of the wobble amplitude is determined as described above, whether or not the track pitch of 0.8 $\mu$m is an appropriate value is considered.

Also in this case, the skew margin is employed as the estimation function of the address error.

Figure 13A:
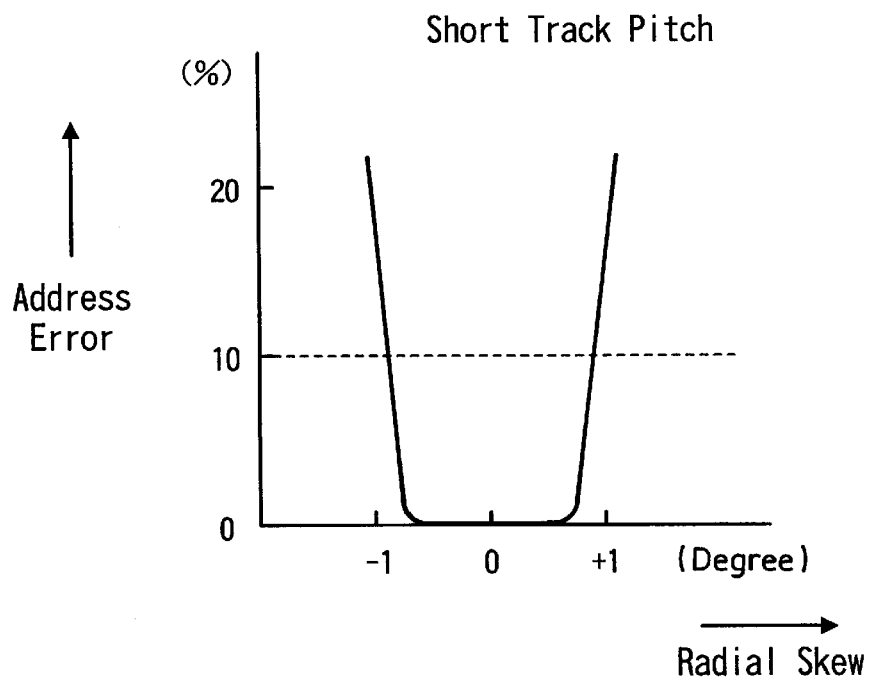
FIG. 13 is an explanatory graph showing the relationship between a track pitch and a radial skew.
Figure 13B:
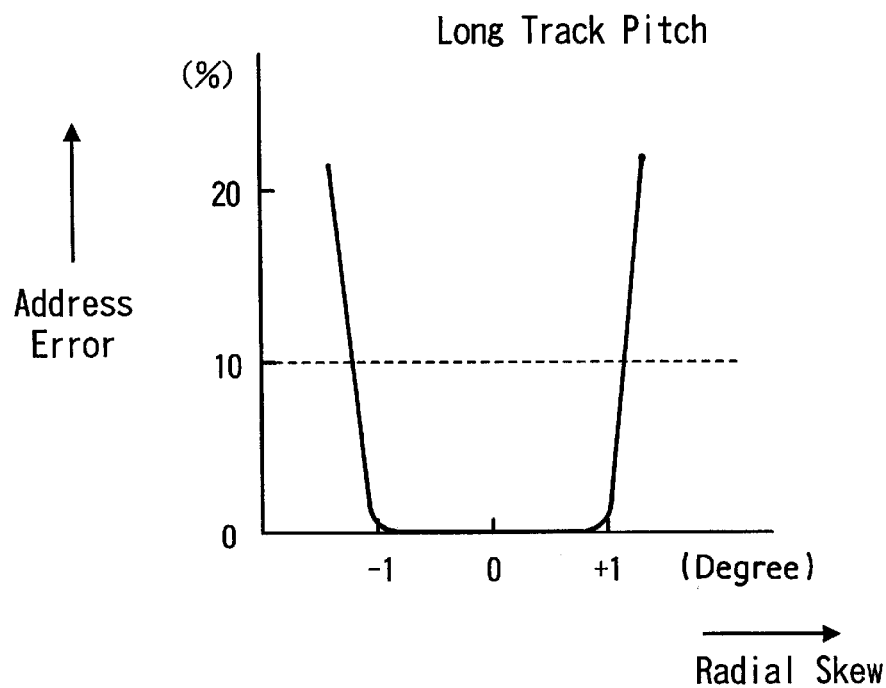

FIG. 13 shows the relationship between the track pitch and the address error. FIG. 13(*a*) shows a state in which the track pitch is small, while FIG. 13(*b*) shows a state in which the track pitch is large. The axis of ordinate stands for the level (%) of the address error and the axis of abscissa stands for a value (degree) of the radial skew.

Here, the width corresponding to 10% of the address error is the skew margin. In the case shown in FIG. 13(*a*), for example, the skew margin is about ±0.9°, in the case shown in FIG. 13(*b*), the skew margin is about ±1.2°.

As can be understood from the figures, the skew margin deteriorates as to the track pitch is narrower.

Figure 14:
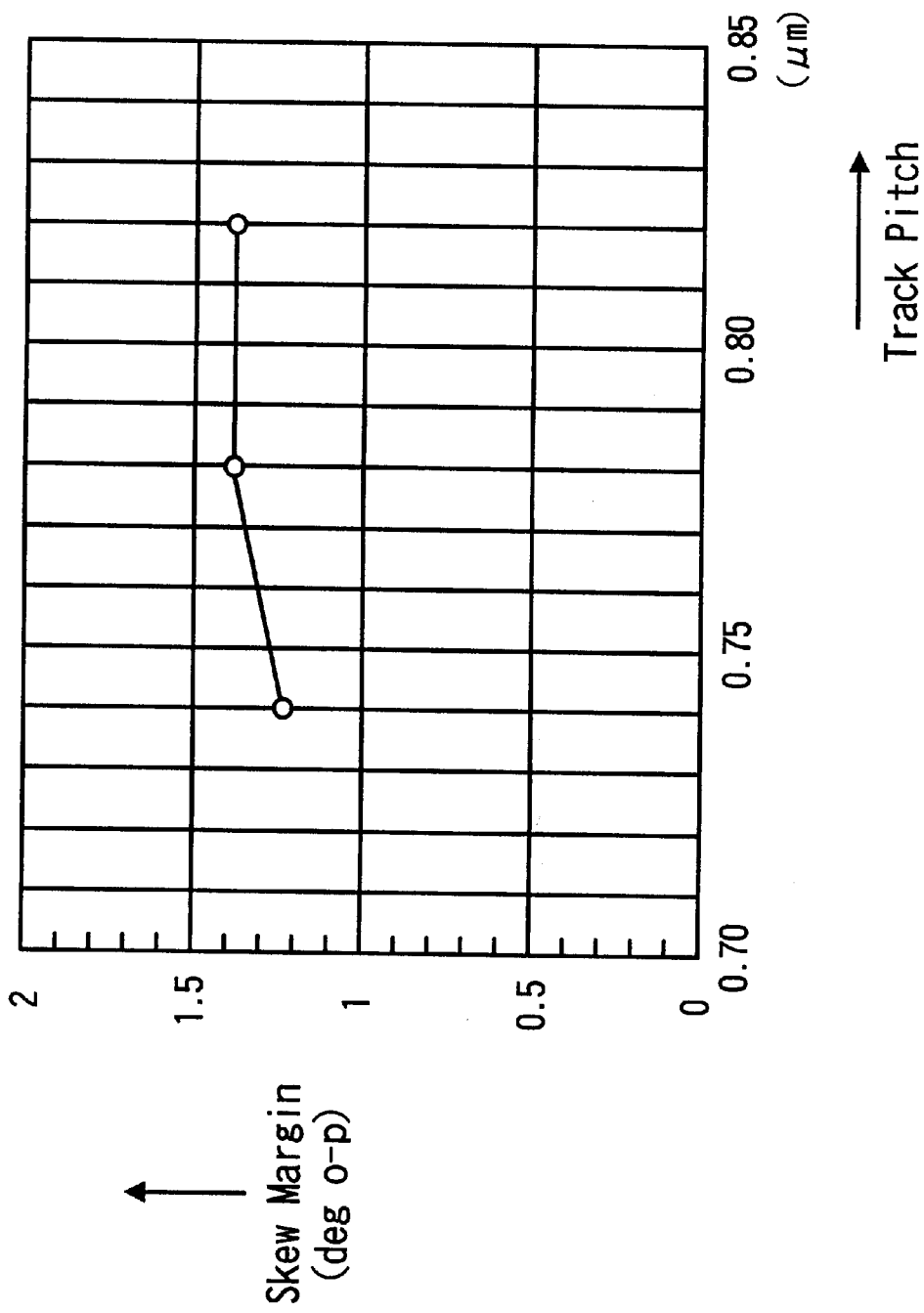
FIG. 14 is an explanatory graph showing the relationship between the skew margin and the track pitch for setting the disk format according to the embodiment.

FIG. 14 shows skew margins with respect to various track pitches. As shown in the figure, the skew margin deteriorates when the track pitch is made narrower as compared with a portion in which the track pitch is about 0.80 $\mu$m.

From this, it can be understood that the preferred track pitch is about 0.80 $\mu$m.

Although the range from 0.74 $\mu$m to 0.82 $\mu$m is a permissible range as the skew margin as shown in FIG. 14, the most preferred value among this range is about 0.80 $\mu$m.

That is, as specifications capable of realizing 3 Gbyte, it can be understood that the specification of this embodiment that the track pitch is 0.8 $\mu$m, the linear density is 0.35 $\mu$m/bit and the wobble amplitude WW is 12.5 nm is one of optimum specifications.

Therefore, this embodiment is able to realize a format satisfactory to realize a required recording capacity and obtain reliability in extracting the absolute address from the wobbling groove and performing a data decoding operation and the like.

The disk according to this embodiment and formatted as described above can satisfactorily be driven by a recording/reproducing apparatus while compatibility with, for example, a DVD-ROM is maintained because the contents of the format is identified in the control data.

As described above, the track pitch and the linear density are, as physical format information in control data, recorded as information of the recording density at the byte position 3.

As information of the book type at the byte position 0, a fact that the disk is a disk having specifications that the track pitch is 0.8 μm, the linear density is 0.35 μm/bit and the wobble amplitude WW is 12.5 nm is caused to be identified.

As a matter of course, the book type may also function as information with which the optical disk can be identified. That is, the optical disk is a disk having a structure that the track on which data will be recorded is previously formed as a phase-change recording region, the track is wobbled with a signal obtained by frequency-modulating the carrier having a predetermined frequency in correspondence with address information and wobbling serving as address information is formed in correspondence with the constant angular velocity.

Further, at the byte positions 33 to 48, recommended information at the first, second and third linear velocities is recorded. As a result of this, a fact is expressed that the disk according to this embodiment employs a peculiar zoning format to be described later to realize the CLD method set to the linear density of 0.35 μm/bit.

Also the above-mentioned structure enables the disk to be identified that the disk is formatted by a method according to this embodiment.

[B] Cutting Apparatus

A method of cutting the disk having the above-mentioned physical format will now be described.

A process for manufacturing a disk comprises a so-called master-disk process (a mastering process) and a disk working process (a replication process) in rough classification. The mastering process is a process for completing a metal master (a stamper) for use in the disk working process. The disk working process is a process for mass-producing optical disks which are replicated products by using the stamper.

Specifically, the so-called cutting is performed in the mastering process which has the steps of coating photoresist on a polished glass substrate and exposing a formed photosensitive film to a laser beam so that a pit and a groove are formed.

In this embodiment, the pit cutting is performed in a portion corresponding to the emboss area of the disk and the cutting of wobbling groove is performed in a portion corresponding to the groove area.

Pit data in the emboss area is prepared in a preparing process called a pre-mastering.

After cutting has been completed, a predetermined processes including development or the like is performed. Then, information is transferred to the metal surface by, for example, electrocasting, so that a stamper required to manufacture disks by replication is manufactured.

Then, the stamper is used to transfer the information on a resin substrate by, for example, an injection method or the like, and a reflecting film is formed thereon. Then, a process for working the substrate into a required shape of the disk is performed so that final products are manufactured.

Figure 15:
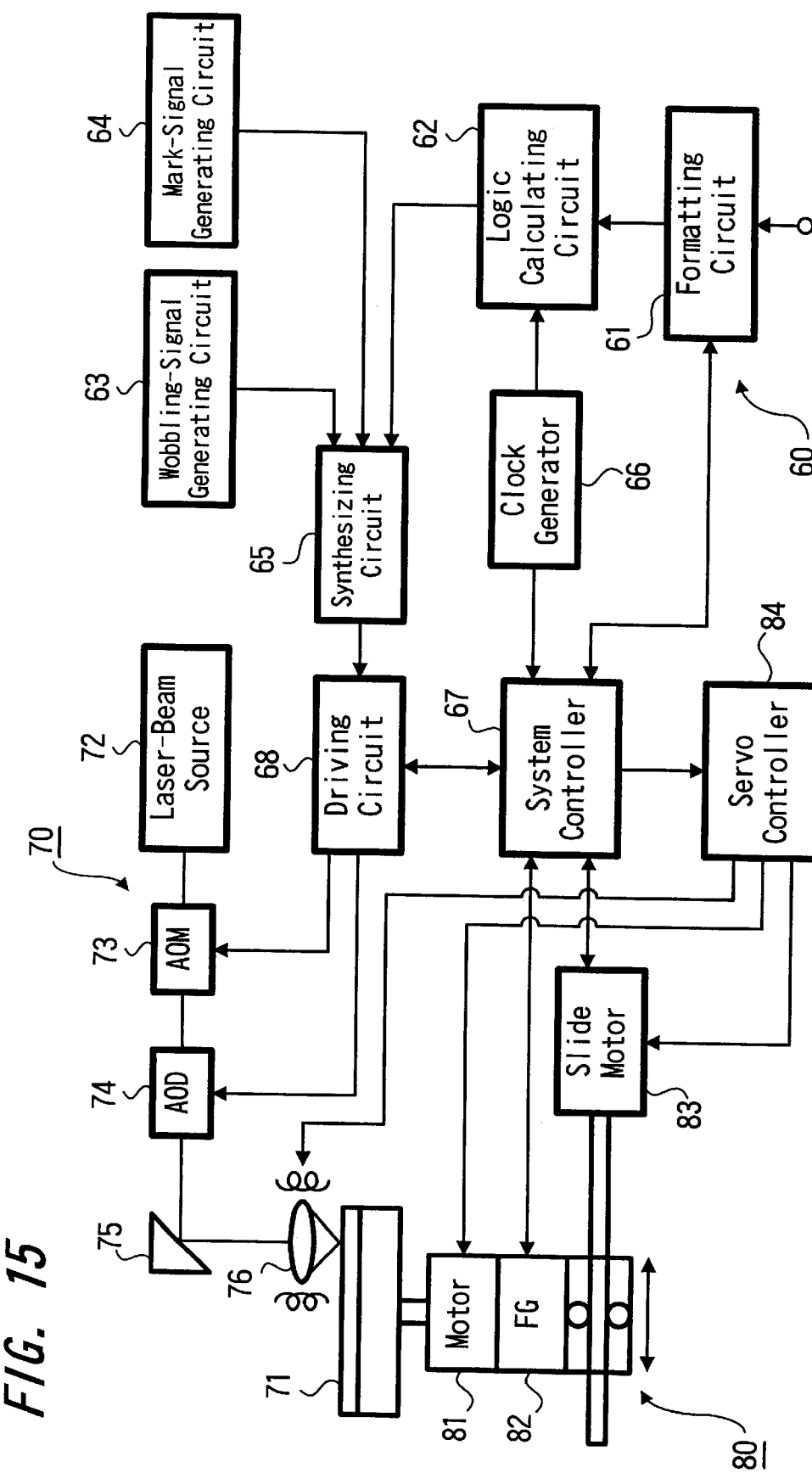
FIG. 15 is a block diagram showing a cutting apparatus for manufacturing the disk according to the embodiment.

The cutting apparatus, for example, as shown in FIG. 15, is formed of an optical unit 70 for irradiating a laser beam on a glass substrate 71 having the photoresist to thereby perform the cutting; a driving unit 80 for rotating the glass substrate 71; and a signal-processing unit 60 for converting inputted data into recording data and controlling the optical unit 70 and the driving unit 80.

The optical unit 70 incorporates a laser-beam source 72 which is made of, for example, a He-Cd laser; an acoustic-optical modulator 73 (AOM) for modulating (on/off) a laser beam emitted from the laser-beam source 72 in accordance with recording data; an acoustic-optical deflector 74 (AOD) for deflecting the laser beam emitted from the laser-beam source 72 in response to a wobbling signal; a prism 75 for bending the optical axis of the modulated beam transmitted from the optical deflector 74; and an objective lens 76 for converging the modulated beam reflected by the prism 75 to irradiate the modulated beam on the photoresist surface of the glass substrate 71.

The driving unit 80 incorporates a motor 81 for rotating the glass substrate 71; an FG 82 for generating an FG pulse for detecting the rotational speed of the motor 81; a slide motor 83 for sliding the glass substrate 71 in the radial direction of the glass substrate; and a servo controller 84 for controlling the rotational speeds of the motor 81 and the slide motor 83 and the tracking of the objective lens 76 and so on.

The signal-processing portion 60 incorporates a formatting circuit 61 for adding, for example, an error correction code or the like to source data supplied from, for example, a computer so as to form input data; a logic calculating circuit 62 for subjecting the data supplied from the formatting circuit 61 to a predetermined calculation so as to form recording data; a wobbling-signal generating circuit 63 for generating a wobble signal for wobbling the groove; a mark-signal generating circuit 64 for generating a signal for forming the fine clock mark; a synthesizing circuit 65; an driving circuit 68 for driving the optical modulator 73 and the optical deflector 74 in response to a signal supplied from the synthesizing circuit 65; a clock generator 66 for supplying a clock to the logic calculating circuit 62 and so forth; and a system controller 67 for controlling the servo controller 84 and so forth in response to the supplied clock.

When the cutting process is carried out by the cutting apparatus, the servo controller 84 causes the motor 81 to rotate the glass substrate 71 at a constant angular velocity, as well as the slide motor 83 to slide the glass substrate 71 in such a manner that a spiral track is formed at a predetermined track pitch while the rotation of the glass substrate 71 is maintained.

Simultaneously, a laser beam emitted from the laser-beam source 72 is allowed to pass through the optical modulator 73 and the optical deflector 74 so as to be formed into a modulated beam in accordance with the recording data, and then irradiated on the photoresist surface of the glass substrate 71 from the objective lens 76. Thus, the photoresist is exposed to the light in accordance with the data and the groove.

On the other hand, the input data to which the error correction code and so forth are added by the formatting circuit 61, that is, data such as control data or the like, which is recorded on the emboss area is supplied to the logic calculating circuit 62 so as to be formed into record data.

At timing at which cutting of the emboss area is performed, the record data is supplied to the driving circuit 68 through the synthesizing circuit 65. The driving circuit 68 controls the optical modulator 73 to turn on the same at a bit timing at which a pit must be formed in accordance with the record data. At a bit timing at which no pit is formed, the optical modulator 73 is controlled so as to be turned off.

At the cutting timing for the groove area, the synthesizing circuit 65 synthesizes a signal corresponding to the fine clock mark transmitted from the mark-signal generating circuit 64 with a signal transmitted from the wobbling-signal generating circuit 63, that is, a signal obtained by frequency-modulating the absolute address so as to supply the same to the driving circuit 68 as a signal for forming the wobbling. The driving circuit 68 controls the optical modulator 73 to continuously be turned on for forming the groove. Moreover, the driving circuit 68 operates the optical deflector 74 in response to the signal supplied for the wobbling. As a result, the laser beam is allowed to meander so that the portions which will be exposed to light as grooves are wobbled.

As a result of the above-mentioned operation, exposed portions corresponding to the grooves/emboss pits are formed on the glass substrate 41 in accordance with the format.

Then, developing, electrocasting and so on are performed so that a stamper is manufactured. By using the stamper, the foregoing disk is manufactured.

The wobbling-signal generating circuit 63 and the mark-signal generating circuit 64 provided for the purpose of forming the wobbling grooves including the absolute addresses will now be described.

Figure 16:
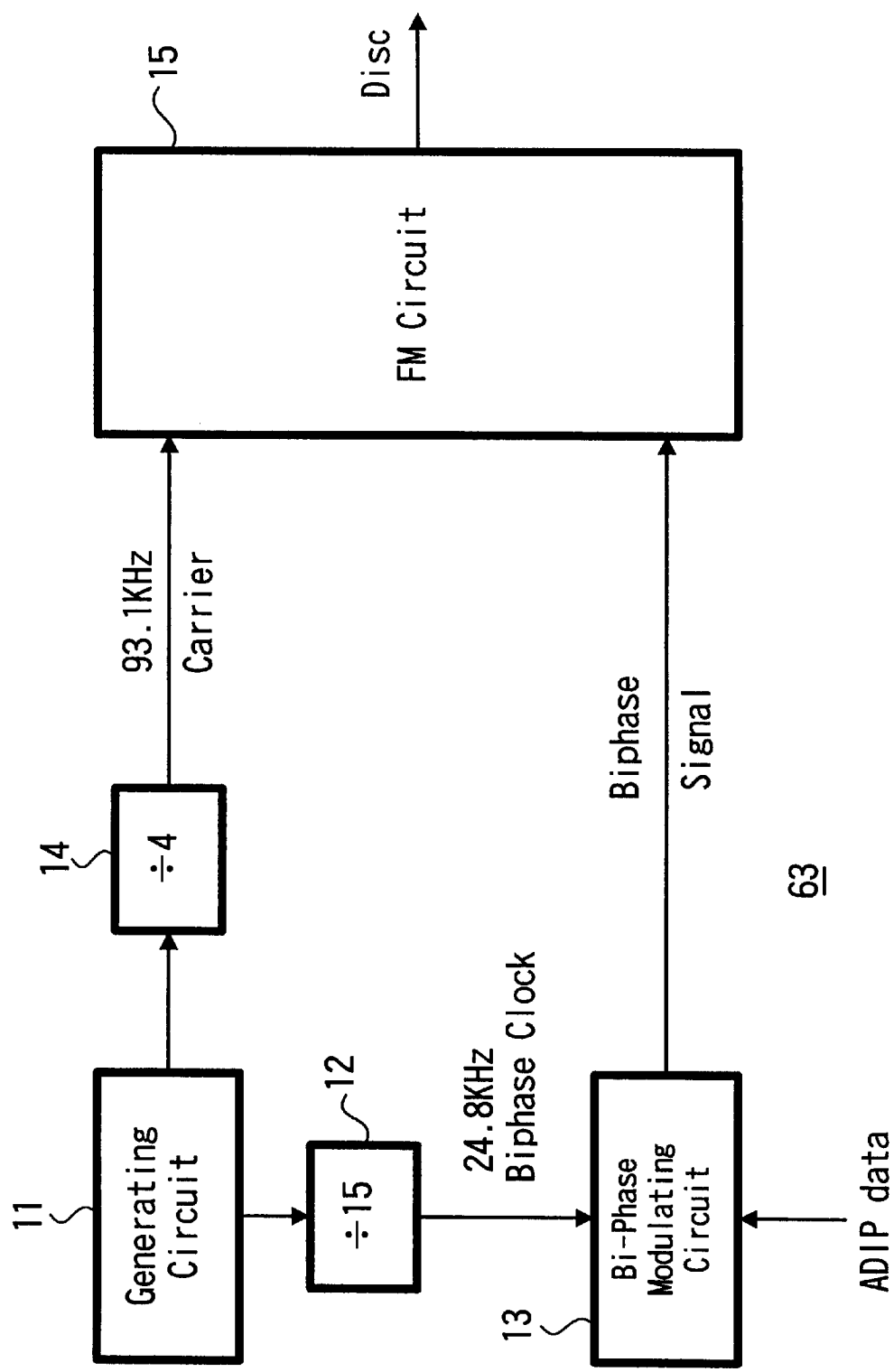
FIG. 16 is a block diagram showing a wobbling signal generating circuit with respect to the disk according to the embodiment.

FIG. 16 shows an example of the structure of the wobbling-signal generating circuit 63 for generating the wobbling signal for wobbling the grooves.

A generating circuit 11 generates a signal having a frequency of 372.4 KHz.

The signal generated by the generating circuit 11 is supplied to a dividing circuit 12 so as to be divided with a value "15". Then, the result of the division is, as a bi-phase clock signal having a frequency of 24.8 KHz, supplied to a bi-clock signal having a frequency of 24.8 KHz, supplied to a bi-phase modulating circuit 13. Moreover, the bi-phase modulating circuit 13 is supplied with ADIP (ADdress In Pre-groove) data as address data.

The bi-phase modulating circuit 13 bi-phase-modulates the bi-phase clock supplied from the divider 12 with the ADIP data supplied from a circuit (not shown) so as to transmit a bi-phase signal to an FM modulating circuit 15.

Moreover, the FM modulating circuit 15 is supplied with a carrier obtained by dividing the signal generated by the generating circuit 11 and having the frequency of 372.4 KHz with a value "4" by a divider 14, the carrier having a frequency of 93.1 KHz.

The FM modulating circuit 15 frequency-modulates the carrier supplied from the divider 14 with the bi-phase signal supplied from the bi-phase modulating circuit 13. Then, the FM modulating circuit outputs an obtained FM signal, that is, as a wobble signal containing the absolute address to the synthesizing circuit 65.

As a result of the above-mentioned cutting apparatus, the right and left side walls of the groove 2 of the disk 1 are formed (wobbled) in correspondence with the wobble signal formed by the frequency modulation.

Figure 17:
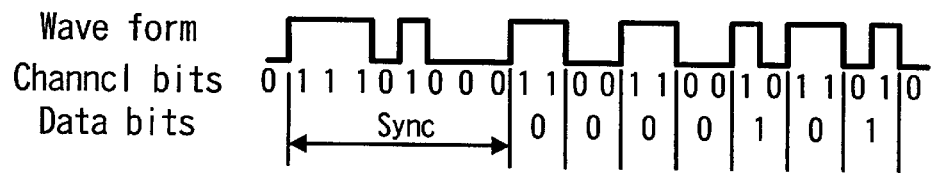
FIG. 17 is an explanatory diagram showing a bi-phase signal which is outputted by the wobbling signal generating circuit with respect to the disk according to the embodiment.
Figure 18:
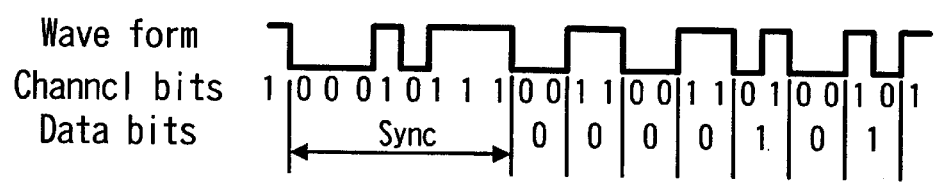
FIG. 18 is an explanatory diagram showing the bi-phase signal which is outputted by the wobbling signal generating circuit with respect to the disk according to the embodiment.

FIGS. 17 and 18 show an example of the bi-phase signal outputted from the bi-phase modulating circuit 13.

In this example, when the preceding bit is 0, 11101000" is employed as the synchronizing pattern (SYNC) as shown in FIG. 17, while when the preceding bit is 1, "00010111" having an opposite phase to that shown in FIG. 17 is employed as the synchronizing pattern. The synchronizing pattern (SYNC) is a unique pattern which does not appear by the modulation and which does not abide by the rule.

As shown in the figures, "0" of the data bits of the absolute address data (ADIP data) is bi-phase-modulated so as to be converted into channel bit "11" (when the previous channel bit is 0) or "00" (when the previous channel bit is 1).

"1" in the data bit is converted into channel bit "10" (when the previous channel bit is 0) or "01" (when the previous channel bit is 1).

Whether conversion to either of the two patterns depends on the previous code. That is, "Wave Form" shown in FIGS. 17 and 18 shows the patterns of the channel bits 1 and 0 such that 1 stands for a high level and 0 stands for a high level. Either of the two patterns is selected in such a manner that the foregoing waveform is continued.

Figure 19:
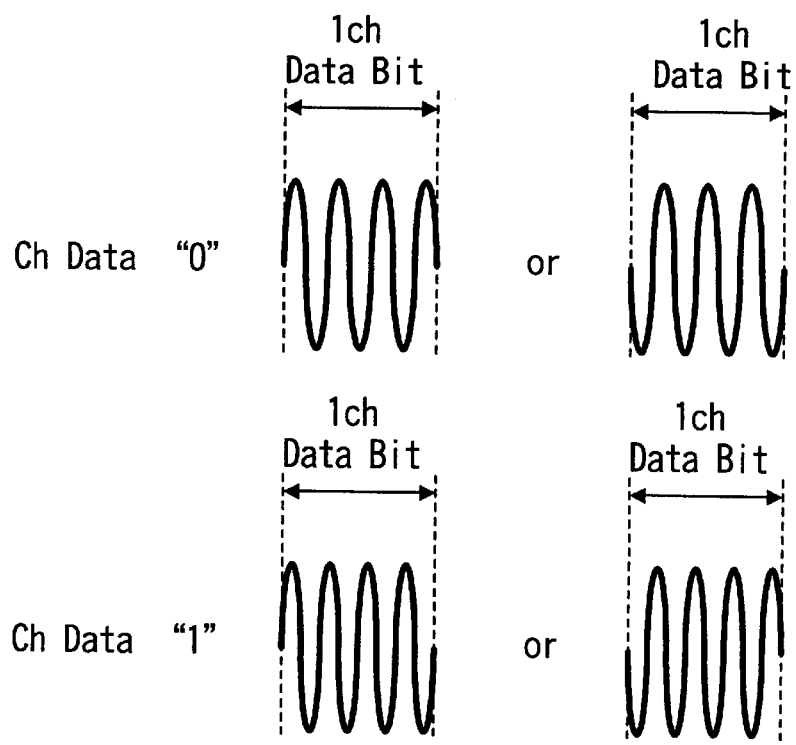
FIG. 19 is an explanatory diagram showing frequency modulation in the wobbling signal generating circuit with respect to the disk according to the embodiment.

As shown in FIG. 19, the FM modulating circuit 15 frequency-modulates the carrier supplied from the divider 14 in correspondence with the bi-phase signal as shown in FIG. 17 or FIG. 18.

That is, when the channel bit data (the bi-phase signal) is "0", the FM modulating circuit 15 outputs 3.5 waves of the carrier in a period corresponding to the half length of the one data bit. The 3.5 waves of carrier start at a half positive wave or a half negative wave.

When the channel bit data (the bi-phase signal) is "1", on the contrary four waves of carrier are outputted in a period corresponding to the half length of one data bit. Also the four waves of the carrier start at half positive wave or half negative wave.

Accordingly, when the channel data bit "00" is supplied to the FM modulating circuit 15 in correspondence with data bit "0", the FM modulating circuit 15 outputs seven waves (=3.5+3.5) of frequency modulation wave in a period corresponding to the length of the data bit. When channel data bit "11" is supplied, the circuit outputs eight waves (=4+4) of frequency modulation wave.

When the channel data bit "10" or "01" is supplied in correspondence to the data bit "1", 7.5 waves (=4+3.5=3.5+4) of frequency modulation wave are outputted.

The carrier having the frequency of 93.1 KHz which is supplied to the FM modulating circuit 15 corresponds to 7.5 waves. The FM modulating circuit 15 corresponds to data so as to generate 7.5 waves of carrier or seven or eight frequency modulation waves obtained by shifting the same waves by +6.20%.

As described above, either of the carriers corresponding to the channel data 0 and the channel data 1, starting at half positive wave and half negative wave respectively and continued from the previous signal, is selected.

FIG. 20 shows an example of frequency modulation wave thus outputted from the FM modulating circuit 15. In this example, the first data bit is made "1" and its channel data bit is made "00". With respect to the first channel data bit "0", 3.5 waves of carrier starting at the beginning point with the half positive wave have been selected.

As a result, the carrier is ended at the half positive wave. Then, 3.5 waves starting with the half negative wave are selected with respect to the next channel data bit "0". Thus, seven frequency modulation waves with respect to data bit "0" are selected.

Data bit "1" (channel bit "10") follows the data bit "0". Since 3.5 waves of channel data bit "0" corresponding to the previous data bit "0" are ended with the half negative wave, a carrier starting with the half positive wave is selected as four carrier waves of the carrier of the first channel data bit "1" corresponding to data bit "1". Since the four waves of channel data bit "1" are ended with the negative half wave, a wave starting with the half positive wave is selected as the following four waves of channel data bit "0".

Then, a similar process is performed so that 7.5 waves, 8 waves and 7 waves of carriers corresponding to data bit "1" (channel data bit "10"), data bit "0" (channel data bit "11") and data bit "0" (channel data bit "00"are formed and outputted in such a manner that the carriers are continued at the boundary (at start and end points).

As shown in FIG. 20, this embodiment has a structure that the length of the channel bit is an integral multiple of ½ of the wavelength of the carrier in any of 7 waves, 7.5 waves and 8 waves of carriers. That is, the length of the channel bit is seven times ½ of the wavelength of the seven waves of carriers (frequency modulation waves) and eight times ½ of the wavelength of the eight waves of carriers (frequency modulation waves). The length of the channel bit is seven times (when the channel bit is "0") or eight times (when the channel bit is "1") ½ of the wavelength of the 7.5 waves of carriers.

In this embodiment, the boundary portion (start or end point) of the bi-phase-modulated channel bit is made to be a zero-cross point of the frequency modulation wave. As a result, the phase of address data (channel bit data) and that of the FM wave are made coincide with each other. Thus, the boundary portion of the bits can easily be distinguished. Therefore, erroneous detection of the address data bit can be prevented. As a result, the address information can easily accurately be reproduced.

In this embodiment, the boundary portion (start and end points) of data bits and the edge (the zero-cross point) of the frequency modulation wave correspond to each other. As a result, a clock can be generated in such a manner that the edge of the frequency modulation wave is used as a reference.

Figures 21A, 21B, 21C, 21D:
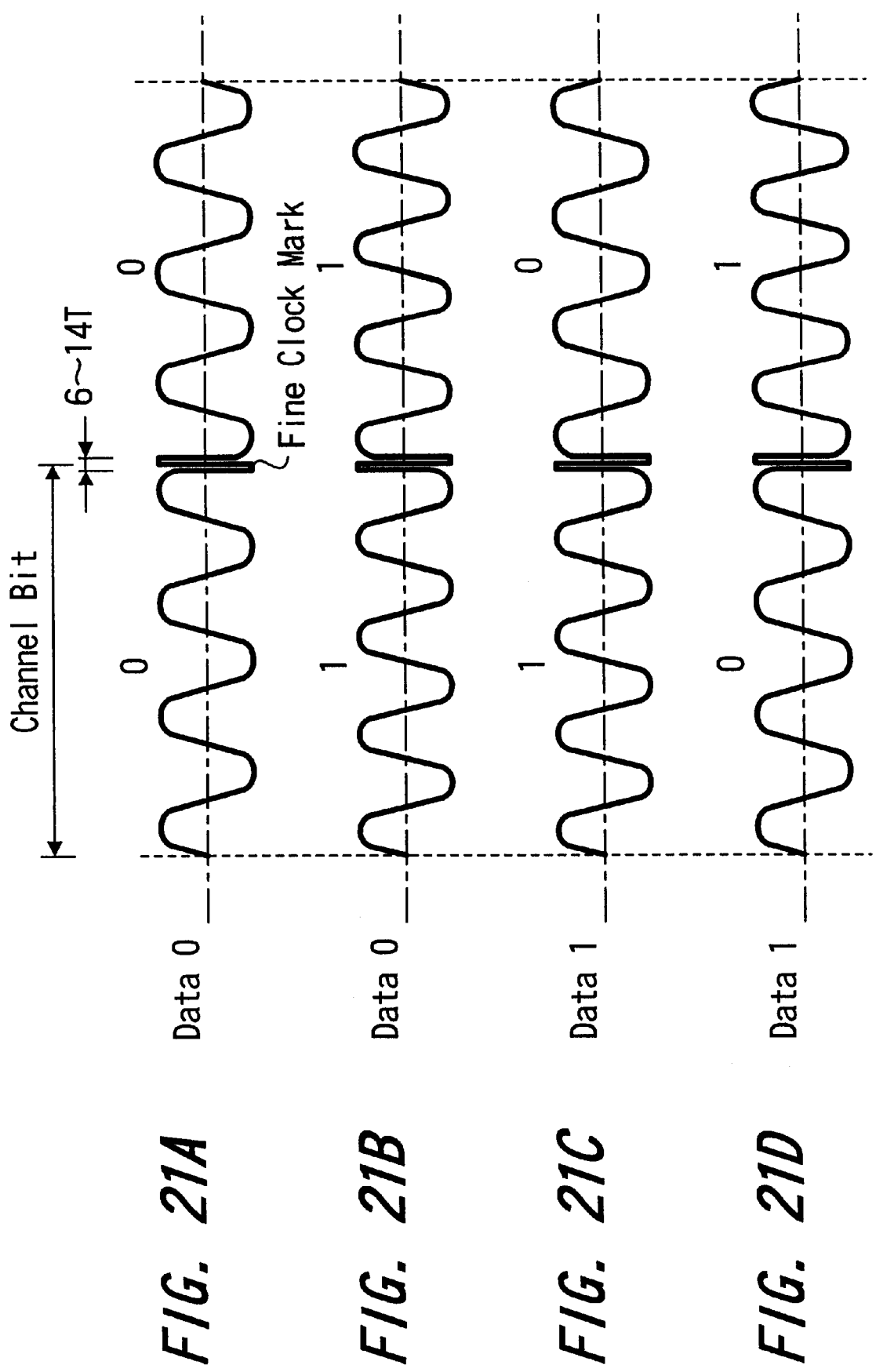
FIG. 21 is an explanatory graph showing the operation for synthesizing the wobbling signal with respect to the disk according to the embodiment.

In this embodiment, by the way; as shown in FIGS. 21 (a) to 18 (d), when the channel bit data is "00" (data "0"), "11" (data "0"), "10" (data "1") or "01" (data "1"), a fine clock mark having a frequency higher than the frequency modulation frequency (93.1 KHz) of address information is synthesized at the zero-cross point of the carrier at the center (switch point of the channel bit) of respective data.

FIG. 21 shows a wobble signal having fine clock marks added at every four data bits. The synthesizing circuit 65 synthesizes a signal supplied from the mark-signal generating circuit 64 to the wobble signal (the frequency modulation wave) supplied from the wobbling-signal generating circuit 63 so as to generate a signal as shown in FIG. 21 at a rate of one time per four bits.

At this time, the fine clock mark is inserted into the zero-cross point of the wobbling frequency modulation wave corresponding to the center (the switching point of the channel data bit) of the address data bit. Thus, fluctuation in the amplitude of the fine clock mark can be reduced and thus the fine clock mark can easily be detected.

If frequency modulation is performed by the above-mentioned FM modulating circuit 15 such that the frequency is shifted from the central frequency by -5% when the channel data bit is zero and when the frequency is shifted from the central frequency by +5% when the channel data bit is 1, the boundary portion of the data bit or the channel data bit and the zero-cross point of the frequency modulation wave do not coincide with each other. Therefore, the channel data bit (or the data bit) can easily be detected erroneously. The insertion point of the fine clock mark is not always the zero-cross point. The fine clock mark is superimposed on a point of the frequency modulation wave having a predetermined amplitude value. As a result, the level of the fine clock mark is raised or lowered by a quantity corresponding to the amplitude value. Thus, a phenomenon is realized in that the detection thereof become difficult.

However, this embodiment with which the fine clock mark is disposed at the position of the zero-cross point of the frequency modulation wave realizes an advantage that its detection or identification from the frequency modulation wave can easily be performed.

[C] Logical Format of Optical Disk
C-1: Sector Format

The logical format of data to be recorded will now be described.

In this embodiment, one cluster is constituted by 32 Kbytes. The cluster is used as a unit when data is recorded. The 32 Kbytes correspond to the above-mentioned ECC block.

One cluster is constituted by 16 sectors.

Figure 22:
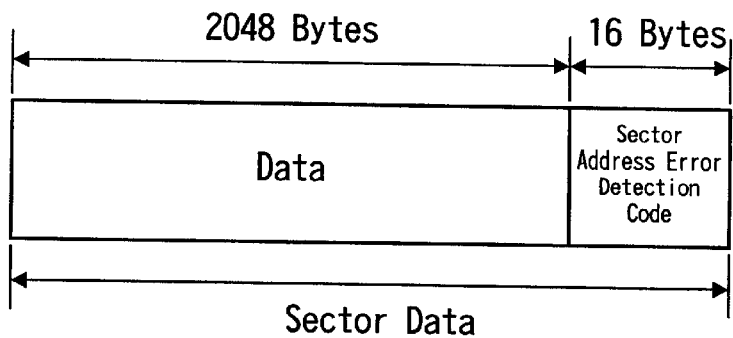
FIG. 22 is an explanatory diagram showing the sector format of the disk according to the embodiment.

As shown in FIG. 22, data of 2 Kbyte (2048 bytes) is extracted as data for one sector, and then a 16-byte overhead is added to data for one sector. The overhead includes a sector address (an address generated or read by an address generation reading circuit 35 to be described later with reference to FIG. 37), an error detection code for detecting an error and so on.

Figure 23:
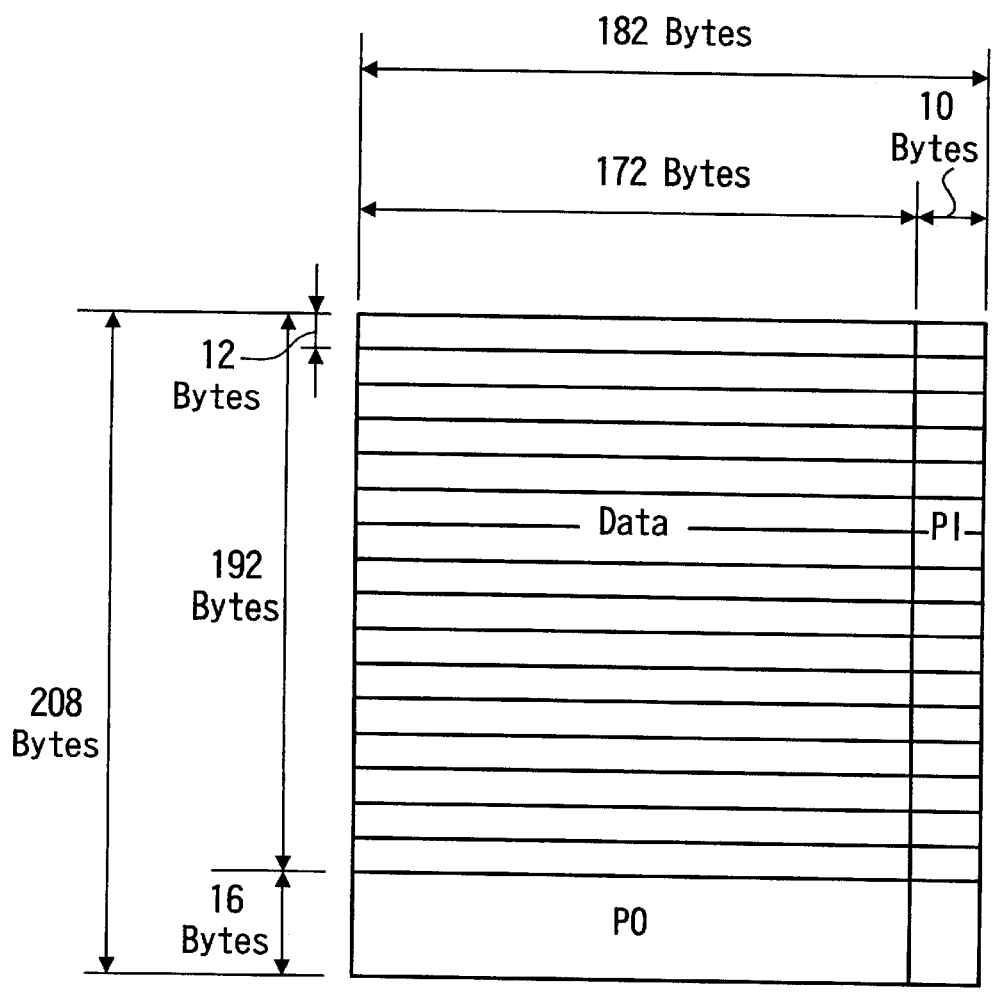
FIG. 23 is an explanatory diagram showing the structure of 32 Kbyte data according to the embodiment.

Data of 2064 (=2048+16) bytes in total is data (one sector) in 12×172 (=2064) bytes formed into one line shown in FIG. 23.

Sixteen data for one sector are collected so that data in a quantity of 192 (=12×16)×172 bytes shown in the figure is constituted.

A 10-byte internal code (PI) and a 16-byte external code (PO) are added to the data in the quantity of 192×172 bytes such that the codes are added to each of bytes in the horizontal and vertical directions as parities.

Figure 24:
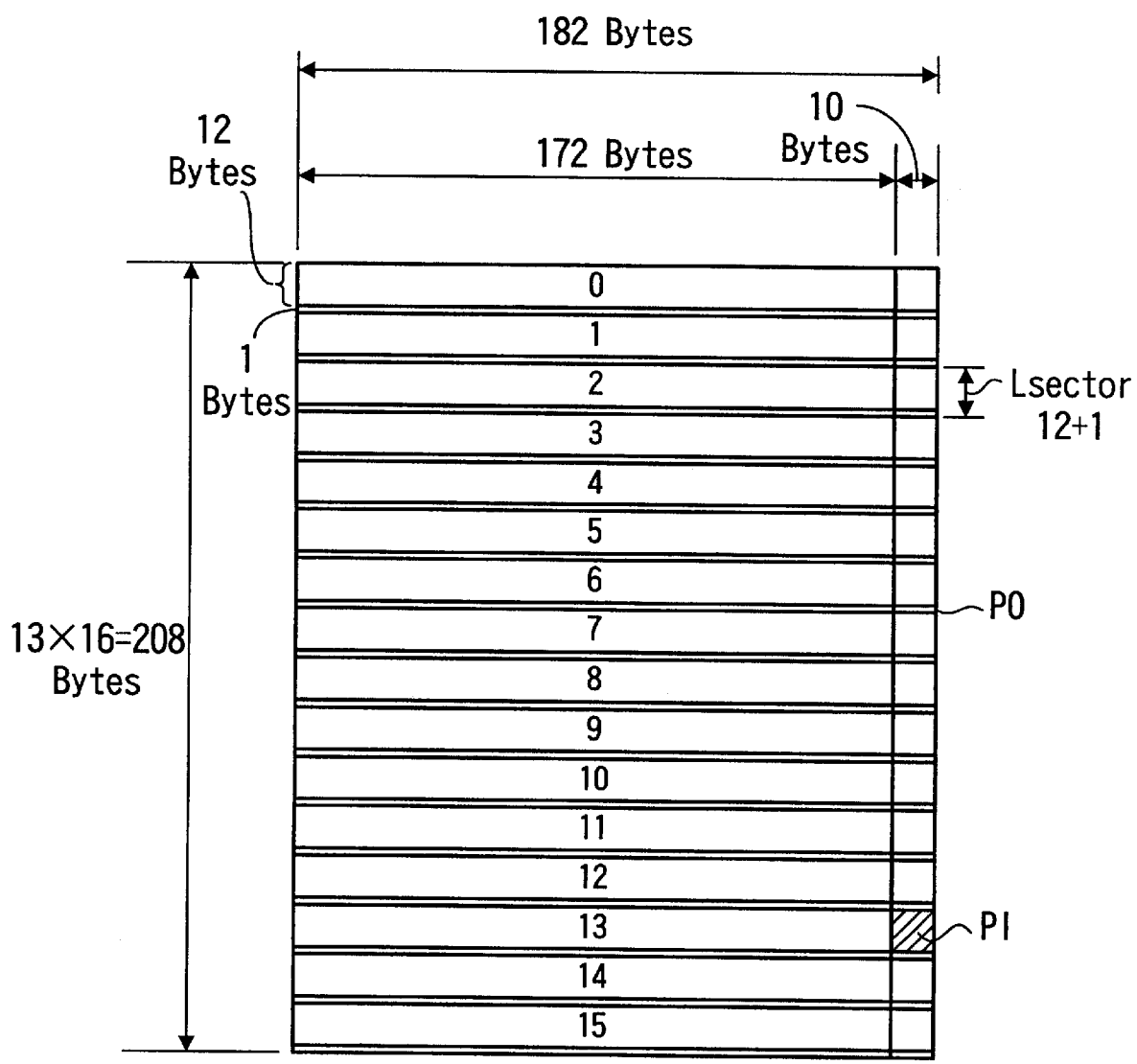
FIG. 24 is an explanatory diagram showing a state in which an external code according to the embodiment is interleaved.

Among thus-formed data blocked into 208×182 bytes (=(192+16)×(172+10)) in total, the external code (PO) in a quantity of 16×182 bytes is sectioned into sixteen data in a quantity of 1×182 bytes. As shown in FIG. 24, each data is added to a portion below 12×182 byte sixteen sector data having No. 0 to No. 15 so as to be interleaved.

Then, data in a quantity of 13 (=12+1)×182 bytes is made to be data for one sector.

Figure 25:
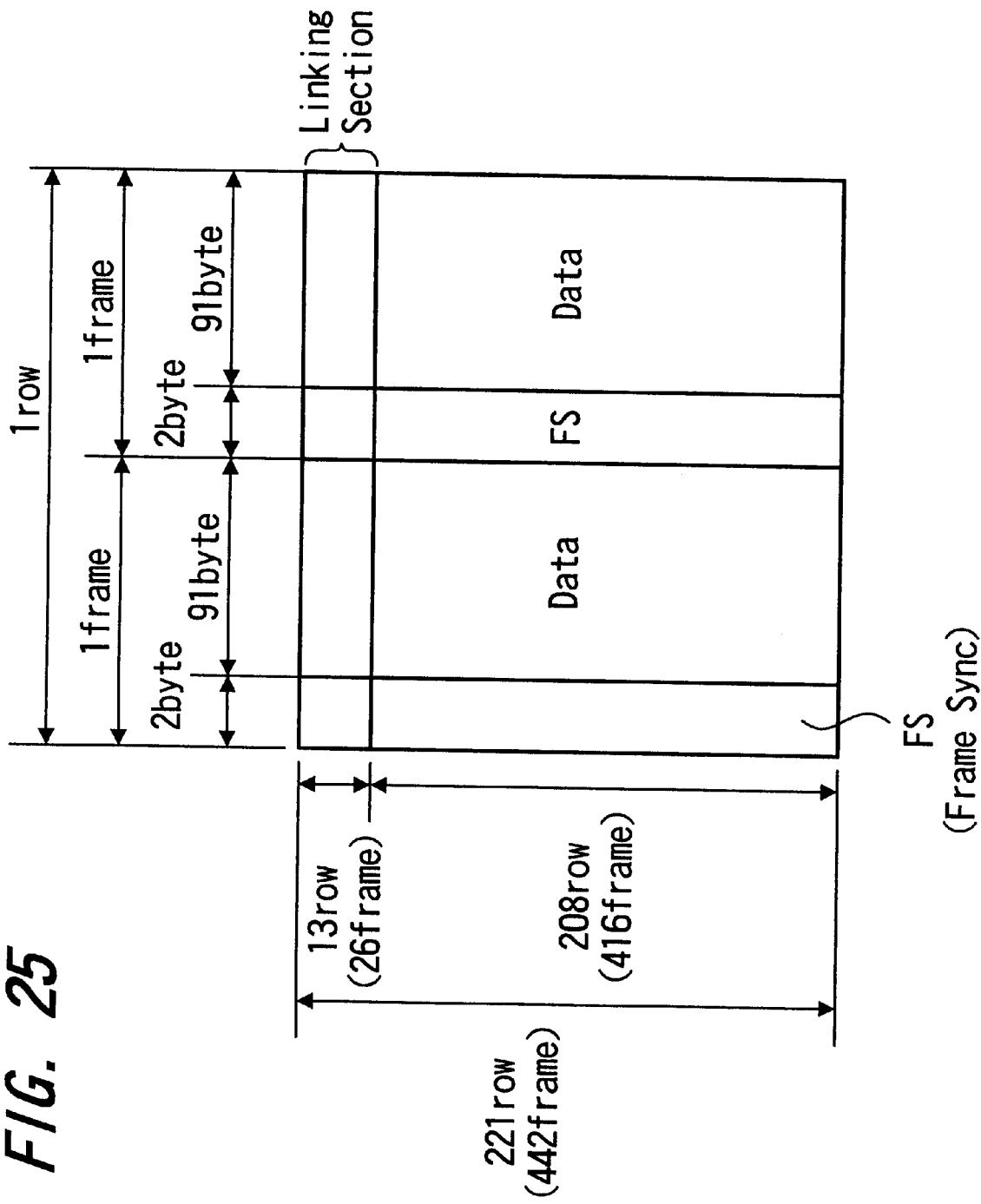
FIG. 25 is an explanatory diagram showing the structure of block data according to the embodiment.
Figure 26:
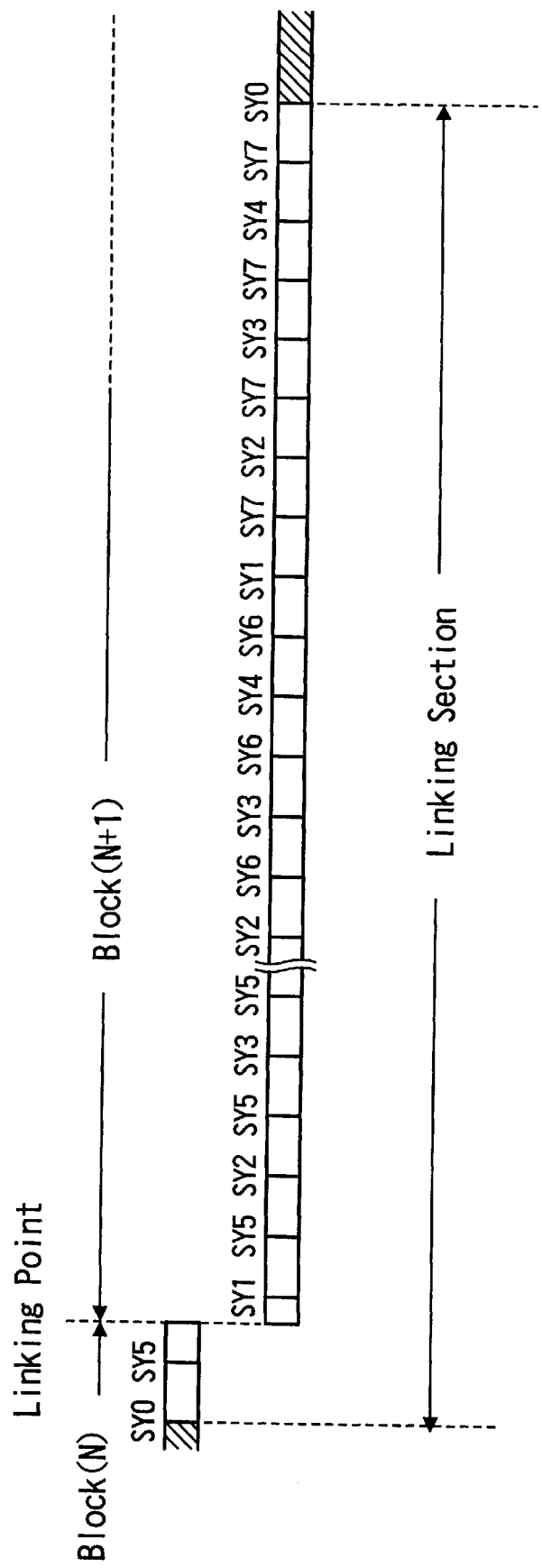
FIG. 26 is an explanatory diagram showing the structure of a linking section according to the embodiment.

Data shown in FIG. 26 and having a quantity of 208×182 bytes is, as shown in FIG. 25, sectioned into two sections in the vertical direction so that one frame is constituted by 91 byte data so that 208 (row)×2(frame) data is formed.

A 13 (row)×2(frame) linking section (data of link area) is added to the leading end of each data in a quantity of 208×2 frames.

More accurately, a portion of the linking section data for 26 frames is recorded at the last of the previous cluster as described later with reference to FIG. 31. The other portion is recorded at the head of the present cluster.

Moreover, a 2-byte frame synchronizing signal (FS) is further added to the head of the 91-byte frame data. As a result, data for one frame is made to be 93-byte data as shown in FIG. 25. Thus, 221 (row)×93×2 bytes in total, that is, data for a block for 442 frames is formed.

The foregoing data is made to be data for one cluster (the block which is a unit for recording). The size of actual data portion except for the overhead portion is 32 Kbytes (=2048×16/1024 Kbytes).

As described above, one cluster is constituted by 16 sectors and one sector is constituted by 26 frames.

C-2: Linking Section

The foregoing data is recorded on the disk 1 at the cluster unit. The linking section shown in FIG. 26 is disposed between the cluster and the cluster.

The linking section is constituted by 26 frames, that is, the size of the linking section is the same as that of the above-mentioned one sector.

The linking section is inserted into the portion between the 32 Kbyte clusters (the blocks).

In actual, division at a linking point is performed at the end of recording operation of the cluster which is block (N) and the recording start point of block (N+1).

FIG. 27 shows the types (SY0 to SY7) of the synchronizing signal for each frame of the linking section and the contents of data.

As shown in the figure, AUX data is sometimes recorded in a predetermined frame as well as all zero data. The portion is sometimes used for controlling the laser power. The types of the frame synchronizing signal will be described later.

Figure 28:
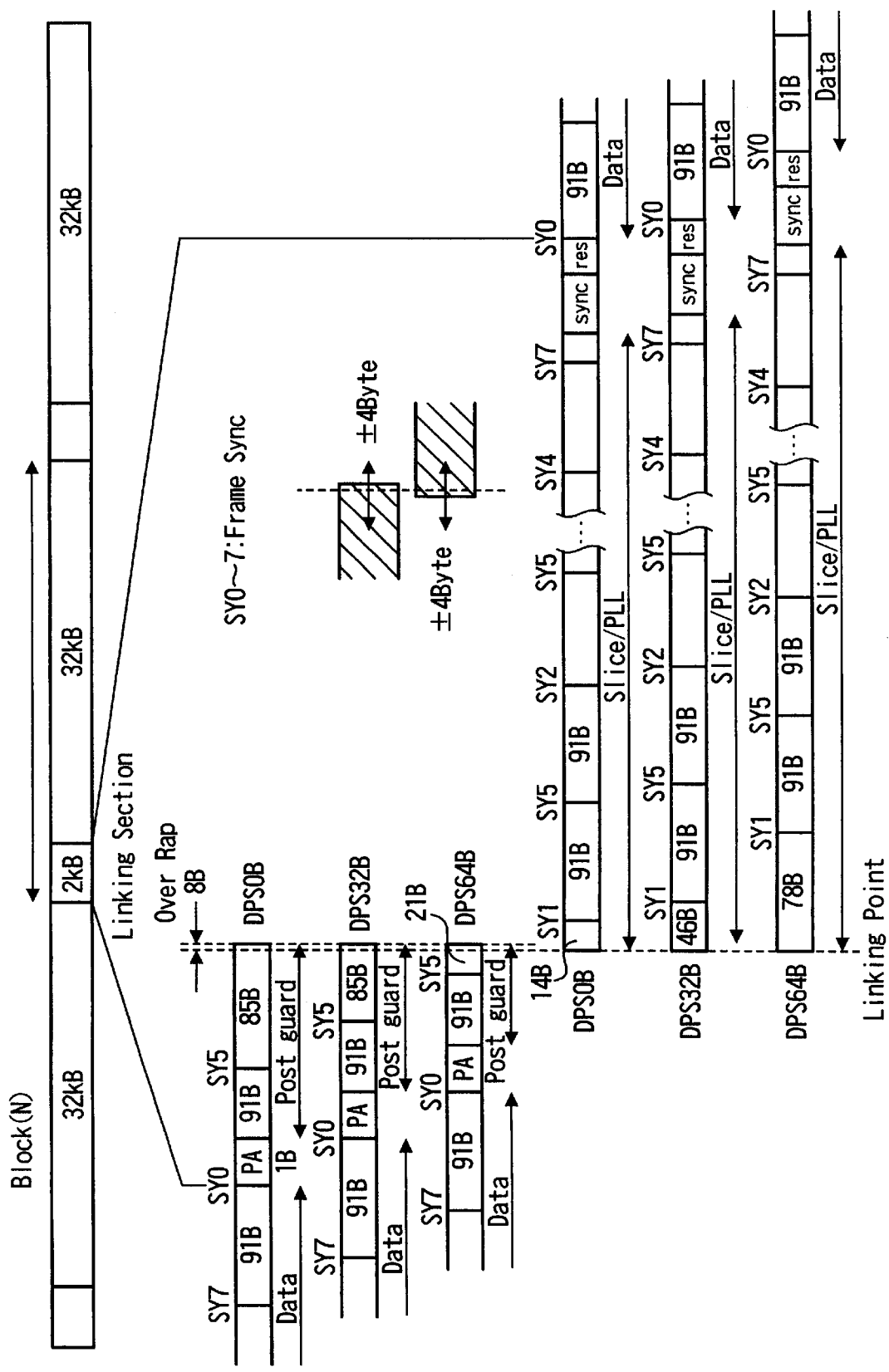
FIG. 28 is an explanatory diagram showing the linking section according to the embodiment.

FIG. 28 shows a state of the linking section which is formed between the clusters.

Data such as Slice/PLL data and data such as frame synchronizing signals SY1 to SY7 and the like are, as the linking section (the portion following the linking point) which is formed at the head portion of the 32 Kbyte data block, recorded on each cluster. Postamble PA and postguard regions are formed next to the 32 Kbyte data block which is the main body of the cluster as the linking section (the portion more before the linking point) at the rear end side of the cluster.

Slice data is data for use to set a time constant for binary-coding reproduced data, while PLL data is data for reproducing the clock.

As for the frame synchronizing signals (frame sync) SY1 to SY7, any one of states 1 to 4 is selected and added as described later with reference to FIG. 31.

Data for adjusting the length of the mark for final data and returning the polarity of the signal is recorded in the postamble PA.

The postguard is an area for absorbing recording jitters which are generated because of eccentricity of the disk, the recording sensitivity of the disk and so on. The postguard has a function for preventing interference of data with a link area on which data will be recorded next even if the data recording start position is changed as described later. The postguard is recorded such that only eight bytes overlap next data when no jitter takes place and DPS (Data Position Shift) to be described later is 0 byte.

The synchronizing signal (sync) is 4 byte data and a signal for establishing the synchronization. Final four bytes of the linking section are maintained (reserved) for future use.

Recording of information on each cluster is started at the linking point. When the recording exceeds (overlaps) the linking point by eight bytes, the recording is completed. When recording is performed, the recording/reproducing circuit 33 of a recording/reproducing apparatus to be described later randomly selects any one of values 0 byte to 64 bytes as DPS. In accordance with the value of the selected DPS, the recording positions for data in the link area and 32 Kbyte block data are changed.

If 0 byte is selected as the DPS as shown in FIG. 28 which is an enlarged view, 14-byte link data is added to a position in front of the first frame synchronizing signal SY1 of the forward linking section. Moreover, 85-byte link data is added to a position in the rear of the final frame synchronizing signal SY5 of the rearward linking section.

If 32 bytes are selected as the DPS, 46-byte link data is added to the position in front of the first frame synchronizing signal SY1 of the forward linking section. Moreover, 53-byte link data is added to the position in the rear of the final frame synchronizing signal SY5 of the rearward linking section.

Further, when 64 bytes are selected as the DPS, 78-byte link data is added to the position in front of the first frame synchronizing signal SY1 of the forward linking section. Moreover, 21-byte link data is added to the position in the rear of the final frame synchronizing signal SY5 of the rearward linking section.

As described above, in accordance with the value of the DPS which is selected by the recording/reproducing circuit 33, the positions at which link data and 32 Kbyte data block are recorded are changed.

Thus, when information is recorded on a phase-change disk, repeated recording of the same data (for example, the frame synchronizing signal and so on) on the same portion of the disk can be prevented. As a result, the lifetime of the disk, which is evaluated by the number of repeated recording number of times, can be elongated.

Since the linking point is fixed at that time, generation of the recording timing can be performed similarly to the conventional structure.

C-3: Frame Synchronizing Signal

Each frame constituting the cluster/sector is added with the frame synchronizing signal at the head position thereof including the frame of the above-mentioned linking section. The types of the frame synchronizing signals are SY0 to SY7.

Figure 29:
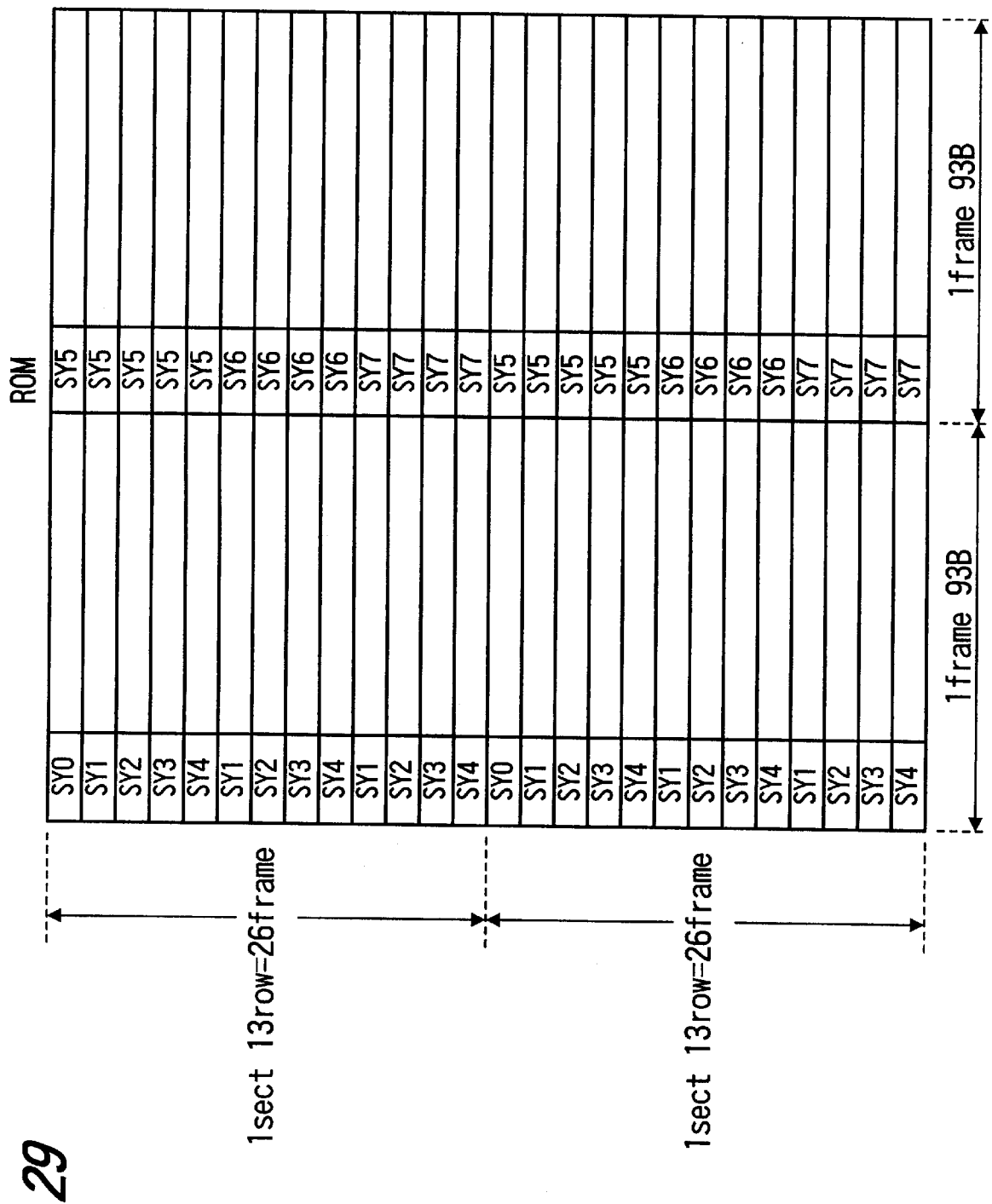
FIG. 29 is an explanatory diagram showing a synchronizing signal for a ROM disk.

FIG. 29 shows the structure of a frame synchronizing signal for a ROM disk (for example, a DVD-ROM) which can compatibly be used with the disk according to this embodiment in the recording/reproducing apparatus of the present embodiment described later. Also the ROM disk has the structure that one sector is composed of data in 13 rows (lines), that is, 26 frames. Moreover, the frame synchronizing signals (SY0 to SY7) are added to the head of each frame. Note that the ROM disk has no linking section.

Frame synchronizing signals are set in each of 26 frames starting from the leading frame as SY0, SY5, SY1, SY5, SY2, SY5, . . . , SY3, SY7, SY4 and SY7 as shown in the figure.

Figure 30:
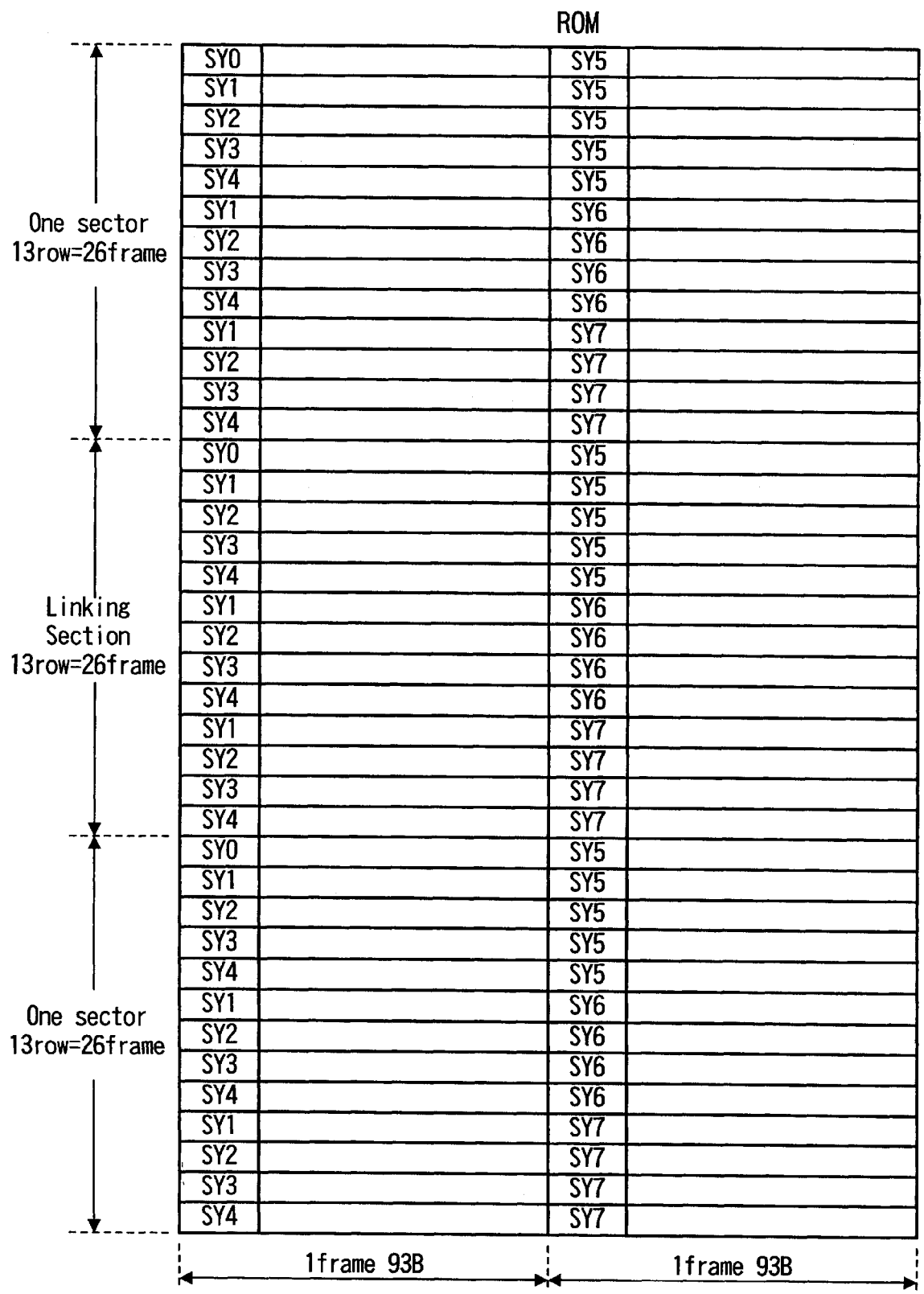
FIG. 30 is an explanatory diagram showing a synchronizing signal for the disk according to the embodiment.

On the other hand, the structure of the frame synchronizing signal of the disk according to this embodiment is shown in FIG. 30. One sector is composed of 13 rows (lines), that is, 26 frames. The frame synchronizing signals (SY0 to SY7) are added to the head of each frame. Also the linking section has a size corresponding to one sector.

In each sector and the linking section, frame synchronizing signals are set in each of 26 frames starting from the leading frame as SY0, SY5, SY1, SY5, SY2, SY5, . . . , SY3, SY7, SY4 and SY7 as shown in the figure.

From a viewpoint of the sector unit, in the ROM disk and the disk according to this embodiment, the types of the frame sync are the same pattern (arrangement) including the linking section.

As a result of the above-mentioned structure, the RAM disk can be reproduced by a reproducing apparatus adapted to only the ROM disk.

That is, the reproducing apparatus adapted to only the ROM disk is arranged such that when the eight frame synchronizing signals SY1, SY7, SY2, SY7, SY3, SY7, SY4 and SY7 stored from the tenth row to the thirteenth row of the data block are detected, a fact that next data is the head portion of the data block is arranged to be recognized. Therefore, the eight frame synchronizing signals are stored in the link area so that the head portion of the data area following the link area can be recognized by the reproducing apparatus.

FIG. 31 shows an example of the frame synchronizing signals SY0 to SY7. Although the frame synchronizing signal is two-byte data, the length of each frame synchronizing signal is 32 bits (4 bytes) because data already converted into channel bit data is shown in this embodiment.

For example, four types of states 1 to 4 exist in SY0. Data of a state is selected with which a DSV (Digital Sum Value) is minimized when addition to frame data in a quantity of 91 bytes (see FIG. 25) is performed. Thus, the selected data is added as the frame synchronizing signal.

C-4: Reason for Setting of Linking Section

As described above, the linking section is a region having an area corresponding to one sector. As a result of the above-mentioned format, the following effects can be obtained.

The linking section has another function serving as an area for establishing synchronization with recording or reproducing clock prior to performing recording or reproducing actual data as the cluster. Therefore, the linking section is required to have a sufficiently large size to generate the clock for use in the recording/reproducing apparatus.

In general, the PLL circuit for extracting a reproducing clock has a somewhat long time constant in order to prevent disturbance of the clock occurring because of a damage of the surface of the disk and so on. Therefore, the determined size of the linking section corresponding to one sector is a preferred length in view of generating the clock. That is, the foregoing length is a preferred length when the disk according to this embodiment is reproduced by any one of various reproducing apparatuses (for example, the DVD-ROM player) or the like.

Since the linking section has the size corresponding to the one sector, also the signal processing system in the recording/reproducing apparatus is not required to perform a complicated process.

That is, the process for reproducing data is performed such that data in one sector unit is performed and error correction is performed in a block as shown in FIG. 25. If the size of the linking section is not one sector, data read from a disk is, in a data unit smaller than one sector, shifted in a quantity corresponding to the linking section. As a result, the circuit structure and the operation become too complicated. This embodiment having the structure that the linking section is considered as data for one sector is able to simplify the process for omitting, for example, data relating to the linking section from data to be read and a process for generating the linking section data when the recording operation is performed.

[D] Zoning Format

The disk according to this embodiment realizes the CLD method by zone CLD in which zone division into a multiplicity of sections is performed.

The zoning format will now be described.

Figure 32:
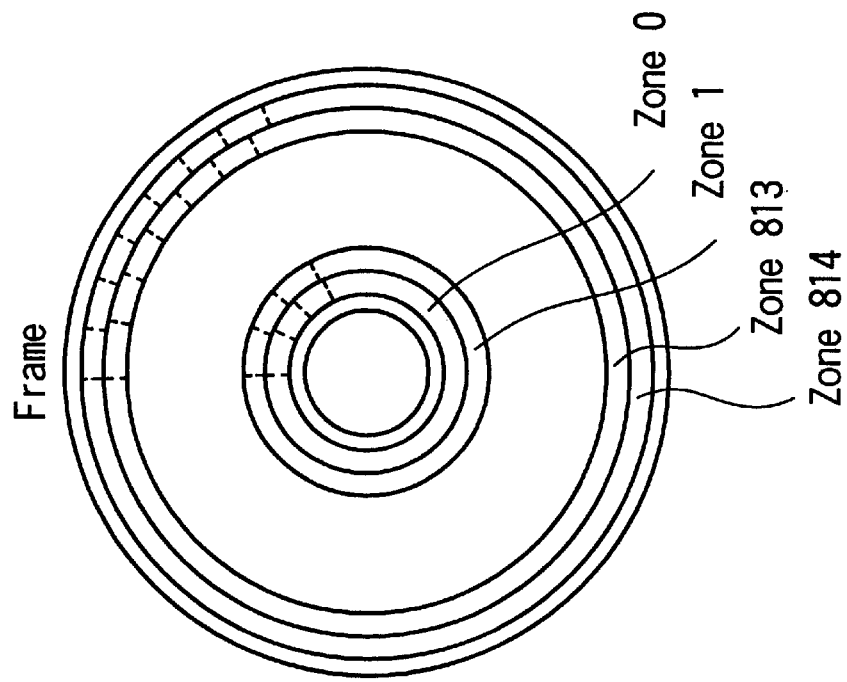
FIG. 32 is an explanatory diagram showing the zone structure of the disk according to the embodiment.

As shown in FIG. 32, the disk according to this embodiment is sectioned into a plurality of zones (in this case, m+2 zones from the 0 the zone to the m+1 the zone) to record or reproduce data.

Assuming that the number of data frames (the data frames are different from the address frames described with reference to FIG. 9 and are units of blocks of data described with reference to FIG. 25) per track in the 0 the zone is n, the number of data frames per tack is (n+1) in a next first zone.

Then, similarly in a zone on more outer peripheral side, the number of data frames increases by one as compared with the adjacent inner peripheral side zone. In the m the zone, the number of data frames is (n+m) and that in the outermost peripheral zone, that is, the (m+1) the zone, the number of data frames is n+(m+1).

The zone is branched at the radial position at which a capacity of (n+1) frames can be obtained at the innermost peripheral linear density which is the same as that of the previous zone. That is, the radial position at which the capacity of (n+1) frames can be obtained at the same linear density which is the same as the innermost peripheral linear density in the 0 the zone is the start point for the first zone.

Similarly, the start position of the m the zone is the radial position at which the capacity of (n+m) frames can be obtained at the same linear density as the innermost peripheral linear density of the 0 the zone.

Figure 33:
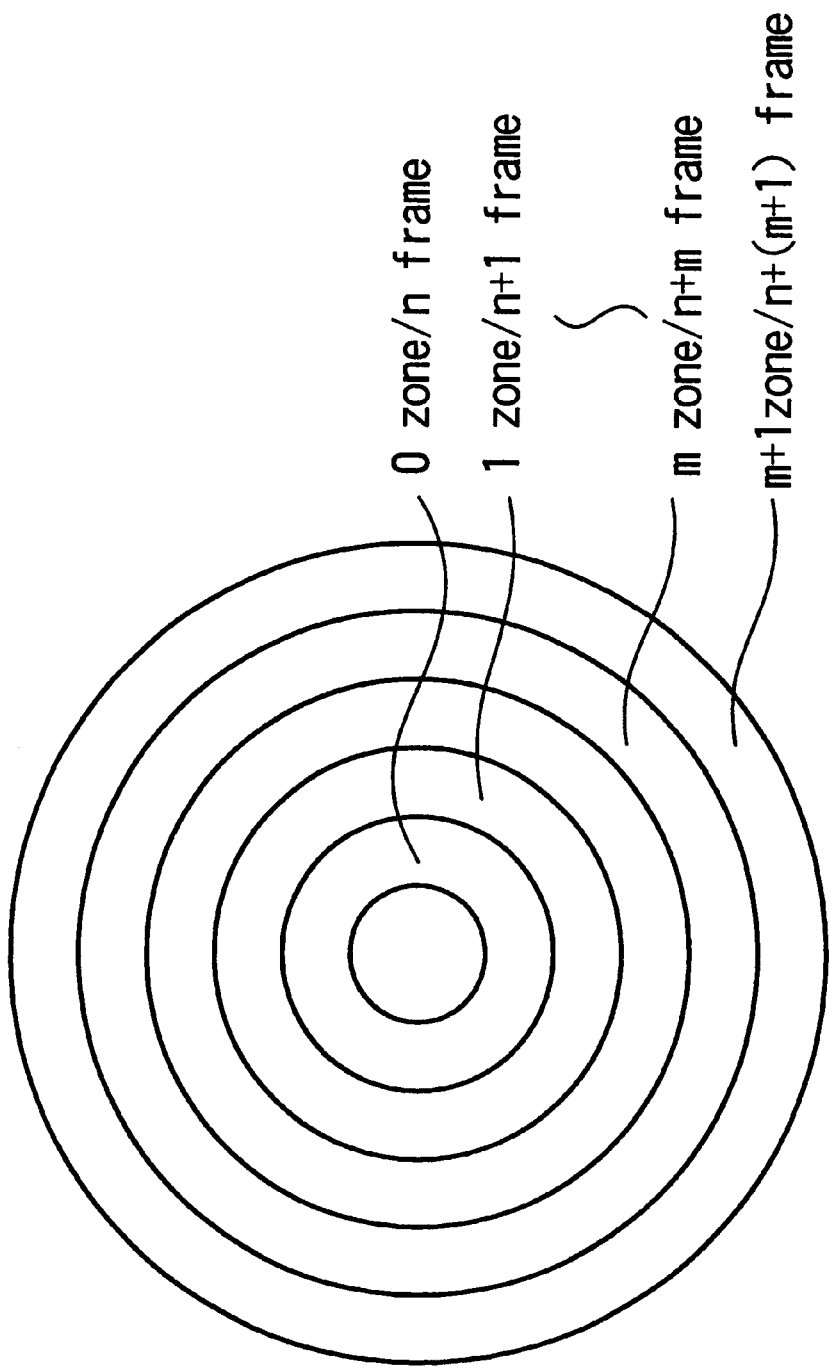
FIG. 33 is an explanatory diagram showing the zone structure of the disk according to the embodiment.

When the disk 1 according to this embodiment has the diameter of 120 mm, the recordable area formed from the radial position of 24 mm to 58 mm, the track pitch of 0.80 $\mu$m and the linear density of 0.351 $\mu$m/bit, the recordable area is zoned into 815 zones from the 0 the zone to the 814 the zone, as shown in FIG. 33.

In the 0 the zone which starts at the radial position of 24 mm, one track (one rotation) has 578 frames. One frame per track is each increased when the zone is incremented by one each.

As described above, this embodiment has the structure that one sector is composed of 26 frames (data frames). Therefore, the number (=1) of frames which is incremented in each zone is made to be a value smaller than the number (=26) of the frames constituting one sector. As a result, larger number of zones can be formed with a finer unit. Thus, the capacity of the disk 1 can be enlarged. The above-mentioned method is called a Zoned CLD (Zoned Constant Linear Density).

Figure 34:
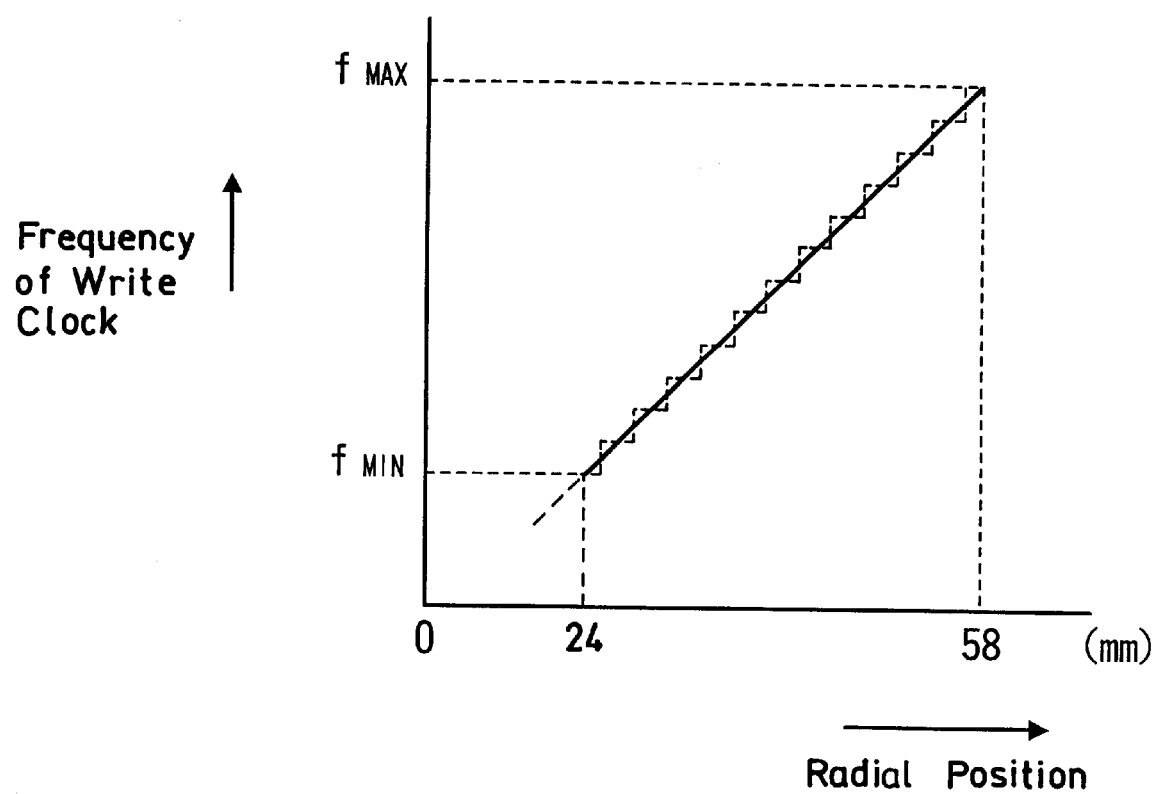
FIG. 34 is an explanatory diagram showing change in a write clock corresponding to the zone structure of the disk according to the embodiment.

When the CLD method is employed, the frequency of the clock must linearly be changed in correspondence with the radial position of the disk as indicated with a solid line shown in FIG. 34. However, the foregoing control cannot easily be performed (which is not impossible) and the same is not required in actual. Therefore, this embodiment has a structure that the frequency of the clock is changed in a stepped manner as schematically indicated with a dashed line. Thus, a method basically similar to the Zoned CAV is employed. However, the zone is sectioned into a multiplicity of, for example, 815 zones so that the amount of change in the linear density within the zone is reduced. Thus, as the Zoned CLD method, the linear density is made to be a substantially constant value of about 0.35 $\mu$m/bit as a center.

Detailed parameters for each zone are shown in FIGS. 35 and 36. All of the parameters for all of 815 zones are omitted from description. Then, as to the 0 th zone to th 23 th zone and as to the 796 th zone to the 814 th zone are shown as examples.

Referring to FIGS. 35 and 36, data on each of the rows indicates each of the zone number, the radial position which is the zone start position, the number of frames per track, the number of tracks per zone, the number of recording/reproducing unit (block) number (the number of clusters) per zone, the linear density within the zone, the capacity of the zone, the rotational speed in the zone, the minimum linear velocity of the zone and the maximum linear velocity of the zone.

As described above, the zoning like the CLV is performed so that change in the frequency of the clock between a zone and the next zone can be made small. Even if the disk according to this embodiment is reproduced by a reproducing apparatus adapted to only the CLV, a clock can be extracted between zones in which the frequency of the clock is changed. Therefore, the portion between zones can continuously be reproduced.

[E] Recording/Reproducing Apparatus

Figure 37:
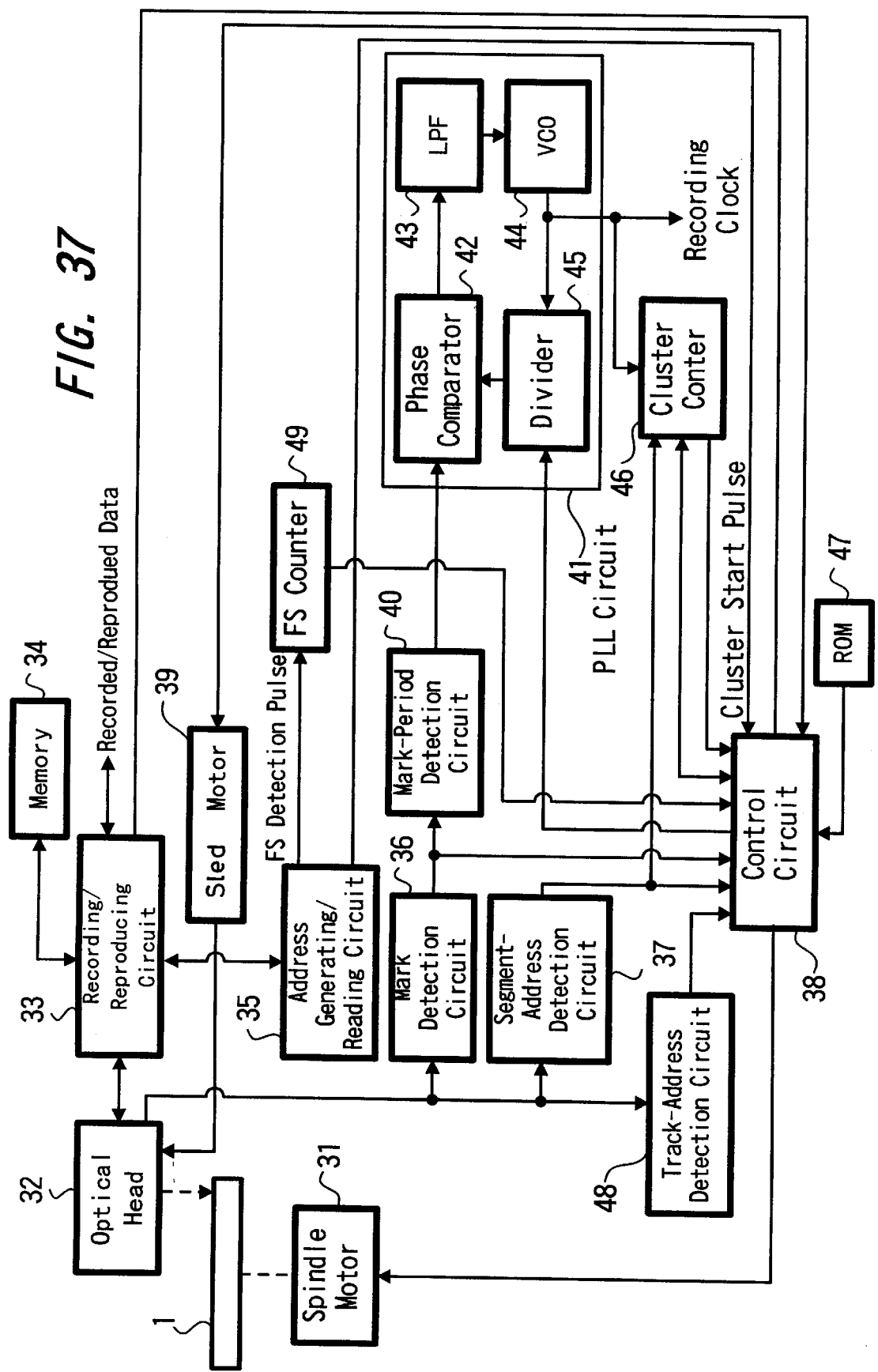
FIG. 37 is a block diagram of a recording/reproducing apparatus according to the embodiment.

FIG. 37 shows an example of the structure of an apparatus for recording/reproducing an optical disk for recording/reproducing data to and from the above-mentioned disk 1.

A spindle motor 31 rotates the disk 1 at a predetermined speed, that is, performs the CAV rotation.

An optical head 32 irradiates the disk 1 with a laser beam so that data is recorded on the disk 1 and reproduces data in accordance with the light reflected from the disk.

A recording/reproducing circuit 33 causes recording data supplied from an apparatus (for example, a host computer)

not shown to temporarily be stored in a memory 34. When data for one cluster, which is a recording unit, has been stored in the memory 34, the recording/reproducing circuit reads data for one cluster therefrom so as to subject read data to encoding, such as interleaving, addition of an error correction code, 8–16 modulation and so on, so as to generate data to be recorded. Then, the recording/reproducing circuit transmits data to be recorded to the optical head so as to cause the optical head 32 to perform an operation for recording data on the disk 1.

When a reproducing operation is performed, the recording/reproducing circuit 33 subjects data obtained from the optical head 32 to decoding, such as 8–16 demodulation, an error correction process, deinterleaving and so on, so as to output decoded data to the apparatus (not shown).

When a recording operation is performed, an address generating/reading circuit 35 responds to a control from a control circuit 38 comprising, for example, a microcomputer to generate an address (which is not the address to be recorded as wobbling information) which is to be recorded in the track (a pre-groove 2) so as to output the address to the recording/reproducing circuit 33.

The recording/reproducing circuit 33 adds the address to data to be recorded so as to output the same to the optical head 32 to be recorded as the address data.

When address data is included in data reproduced from the track of the disk 1, the recording/reproducing circuit 33 separates the address data from reproduced data so as to output the address data to the address generating/reading circuit 35. The address generating/reading circuit 35 outputs the read address to the control circuit 38.

Moreover, the address generating/reading circuit 35 detects the frame synchronizing signal FS (frame sync) in data so as to output a result of the detection to a frame sync (FS) counter 49. The FS counter 49 counts the number of the FS detection pulses outputted from the address generating/reading circuit 35 and outputs its count value to the control circuit 38.

A mark detection circuit 36 detects a component corresponding to the fine clock mark from an RF signal (the wobbling signal) reproduced by and outputted from the optical head 32. A detection signal transmitted from the mark detection circuit 36 is supplied to the control circuit 38 and a mark-period detection circuit 40.

A segment-address detection circuit 37 and a track-address detection circuit 48 detect the segment number and the track number from the wobbling signal outputted from the optical head 32, respectively. As described above with reference to FIG. 9, the 48-bit wobbling address frame has the track number (the track address) and the segment number (information about the circumferential position). The foregoing numbers are detected by the track-address detection circuit 48 and the segment-address detection circuit 37 and then supplied to the control circuit 38.

The detected track address is also supplied to a cluster counter 46.

The mark-period detection circuit 40 determines the periodicity of the detection pulses which are outputted when the mark detection circuit 36 has detected the fine clock mark. That is, the fine clock mark is generated at a predetermined cycle (every four bits). Therefore, the mark-period detection circuit determines whether or not the detection pulse supplied from the mark detection circuit 36 is a detection pulse generated at the predetermined cycle. If the detection pulse is the detection pulse generated at the predetermined cycle, the mark-period detection circuit generates a pulse synchronized with the detection pulse and outputs the pulse to a phase comparator 42 of a PLL circuit 41 at the rear stage.

If the detection pulse is not supplied at the predetermined cycle, the mark-period detection circuit generates a pseudo pulse at a predetermined timing so as to prevent locking of the following PLL circuit 41 to an incorrect phase.

The PLL circuit 41 incorporates, in addition to the phase comparator 42, a low-pass filter 43, a voltage-controlled oscillator (VCO) 44 and a divider 45.

The phase comparator 42 subjects the phase of an input from the mark-period detection circuit 40 and that of an input from the divider 45 to a comparison so as to output a phase error therebetween. The low-pass filter 43 compensates for the phase of the phase error signal outputted from the phase comparator 42 so as to output a result of the compensation to the VCO 44. The VCO 44 generates a clock in the phase corresponding to the output of the low-pass filter 43 so as to outputs the clock to the divider 45. The divider 45 divides the clock supplied from the VCO 44 with a predetermined value and outputs a result of the frequency division to the phase comparator 42.

The clock outputted from the VCO 44 is, as a recording clock, supplied to a required circuit and also supplied to the cluster counter 46. The cluster counter 46 counts the number of clocks outputted from the VCO 44 such that the track address in the wobbling signal supplied from the track-address detection circuit 48 is used as a reference. If the counted value thereof reaches a predetermined value (a value corresponding to the length of one cluster), the cluster counter generates a cluster start pulse and outputs the same to the control circuit 38.

A thread motor 39 is controlled by the control circuit 38 so as to move the optical head 32 to a predetermined track position on the disk 1. The control circuit 38 controls the spindle motor 31 so as to rotate the disk 1 at a predetermined speed.

A ROM 47 includes the track number in the address frame, a table for determining the relationship with the zone formed by zoning the data recording region in the disk 1 and, if necessary, a table for determining the relationship with the zone and the band to which the zone corresponds.

The control circuit 38 controls the respective units of the apparatus to cause the recording/reproducing operation corresponding to the zoning format to be performed.

When the control circuit 38 acquires the sector number indicating a point to which an access is made, the control circuit performs a process for replacing the sector number for track number and the data frame number of the track.

That is, in the ROM 47, a table is stored which shows the sector number, the zone number, as shown in FIG. 39, the ECC block number, the number of frames per zone, the track number, the number of the frames per track and so on. The control circuit 38 makes a reference to the table to read the track number corresponding to the instructed sector number and the number of data frames in the track.

On the other hand, the control circuit 38 detects the track number from the output of the track-address detection circuit 48, that is, the present track address which can be detected from the wobbling signal.

When a required (to which an access is made) track number is detected by the track-address detection circuit 48, the control circuit 38 detects the reference position for the track.

Figure 40:
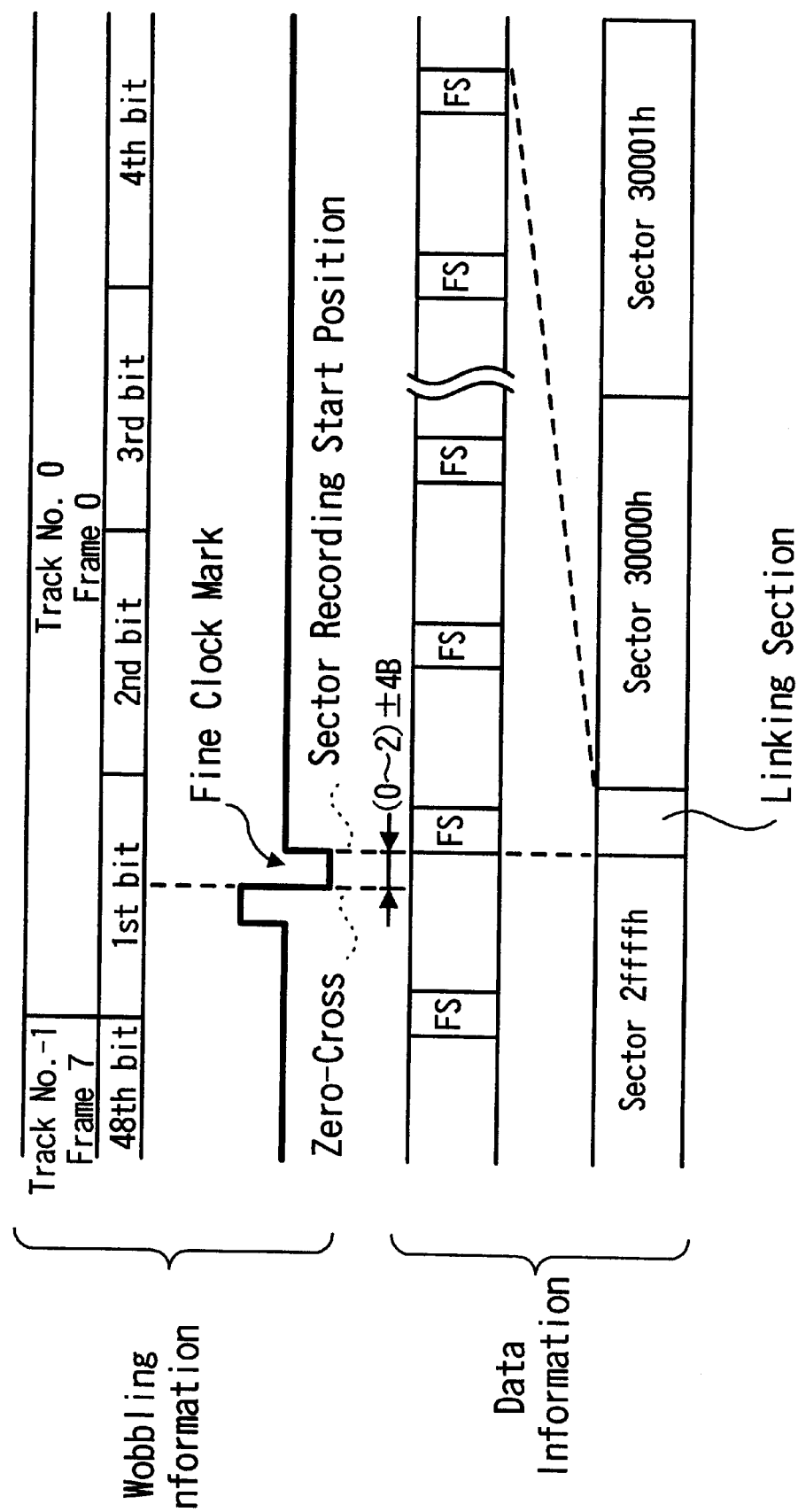
FIG. 40 is an explanatory diagram showing the operation of the recording/reproducing according to the embodiment.

As shown in FIG. 40, the track number serving as the wobbling information is recorded on the disk 1. Moreover, a clock synchronization mark is recorded in the address frame of each track at a period of four bits. The control circuit 38 detects the fine clock mark inserted into the first bit of the 48 bits of the first address frame (the address frame having the segment number 0) of a predetermined tack, the fine clock mark being detected as a reference fine clock mark.

When one fine clock mark serving as the reference is detected per round of the track, the control circuit 38 resets the count of the FS counter 49. Then, the FS counter 49 counts the frame synchronizing signal when it is detected.

If the counted value of the FS counter 49 becomes to the value corresponding to the sector number which must be retrieved, a determination is made that the sector is the sector which must be retrieved.

When recording in a predetermined sector is performed, the control circuit 38 controls the recording start position of the recording in the sector to be in a range of (1 to 2)±4 bytes from the timing of the zero-cross of the fine clock mark serving as the reference.

As described above, the control circuit 38 is able to perform control such that an access is made to an arbitrary position (at an arbitrary position in one rotation) on the track from the count value of the recording clock in such a way as to use the clock synchronizing mark which is detected first in the frame (the address frame) having, for example, the frame number 0 as a reference.

That is, the access is permitted in accordance with the track and the data frame unit.

When an access to an arbitrary position on the track is made as described above, the zone to which the access point belongs must be determined. Moreover, the clock having the frequency corresponding to the zone must be generated by the VCO 44. The control circuit 38 performs a clock switching process arranged as shown in a flow chart shown in FIG. 38.

That is, initially, in step F101 the control circuit 38 reads the track number from the address of the access point outputted from the track-address detection circuit 48. In step F102 the control circuit reads, from the table stored in the ROM 47, the zone corresponding to the track number read in step F101.

As described above, the table stored in the ROM 47 has information about the zone among the 0 the to the 814 the zones to which the tracks having the numbers belong.

In step F103 whether or not the read track number indicates a new zone which is different from the zone to which an access has been made up to now. If a determination is made that the zone is a new zone, the operation proceeds to step F104 so that the control circuit 38 controls the divider 45 to cause the frequency division ratio corresponding to the new zone to be set. As a result, recording clocks having frequencies different dependent on the respective zones are outputted from the VCO 44.

If a determination is made in step F103 that the present zone is not a new zone, the process in step F104 is skipped. That is, the frequency division ratio of the divider 45 is not changed so that the present clock frequency is maintained as it is.

Figure 38:
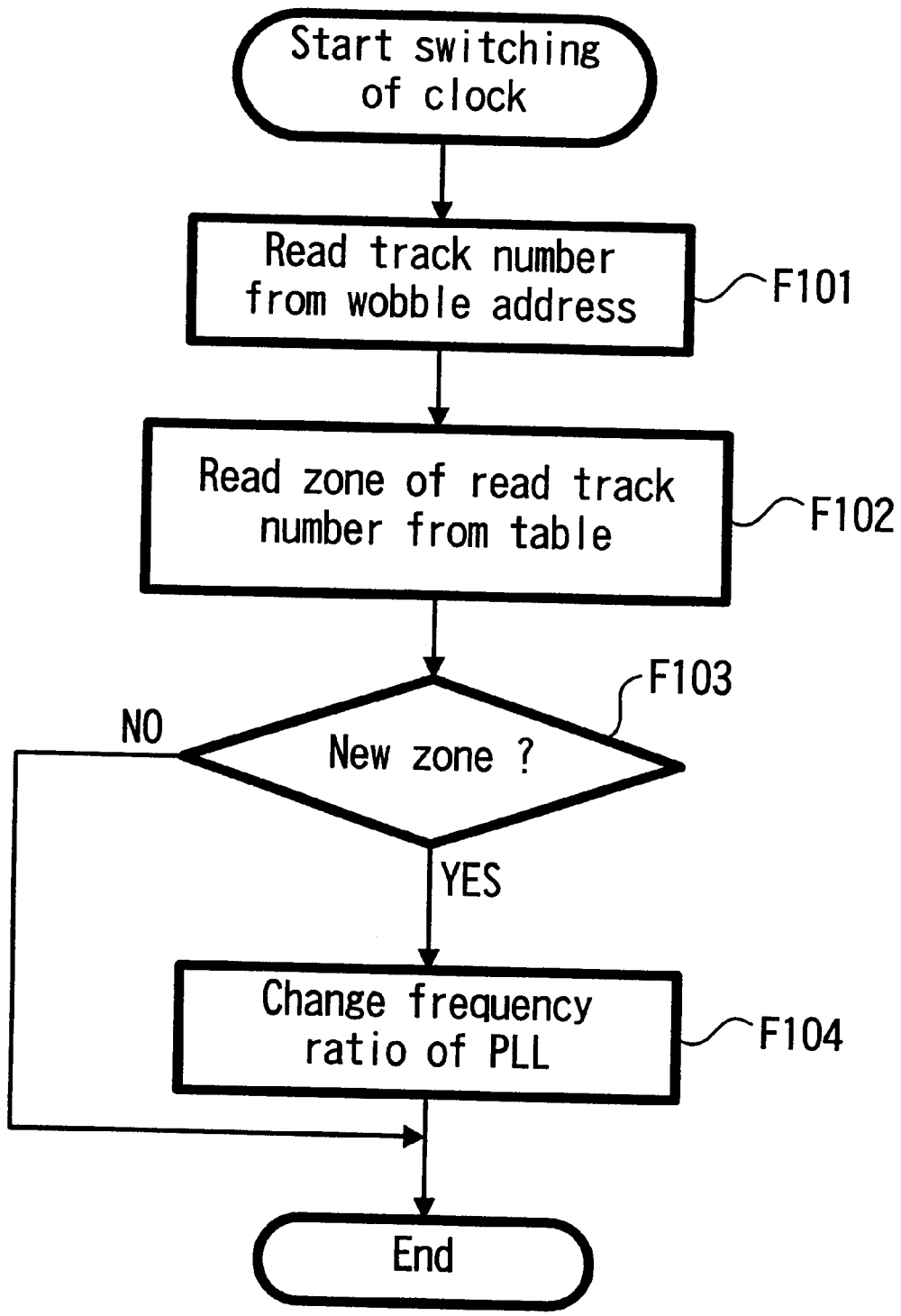
FIG. 38 is a flow chart of a clock switch process of the recording/reproducing apparatus according to the embodiment.

In the process shown in FIG. 38, a reference to the table in the ROM 47 is made in accordance with the address (the track number) so as to determine the zone. Thus, the clock frequency which must be generated is set. A structure may be employed in which data in the table stored in the ROM 47 is not used (that is, it is made unnecessary) and the clock frequency which must be generated is determined by performing a predetermined calculation using the track number so as to set a frequency division ratio.

Although the disk, the adaptable cutting apparatus and the recording/reproducing apparatus according to the embodiment have been described, the present invention is not limited to the foregoing example. As a matter of course, the values about the format and no relationship with the thesis of the present invention may be varied.

As described above, the optical recording medium according to the present invention has the structure that an amount of amplitude of wobbling of the tracks is made to be a value satisfying 10 nm to 15 nm and a track pitch of the track is made to be a value satisfying 0.74 $\mu$m to 0.82 $\mu$m. The above-mentioned values enable a predetermined data recording capacity on the optical recording medium under a condition of a predetermined NA and laser wavelength. Moreover, the relationship between the amount of the amplitude of wobbling and the track pitch is made to be a value with which a satisfactory reproduction error rate of address information and reproduction information can be obtained. That is, an effect can be obtained in that a new optical recording medium is provided with which large capacity recording can be realized without deterioration in the recording/reproducing performance.

Moreover, the optical recording medium according to the present invention has the structure that wobbling serving as address information is formed on the track serving as a phase-change recording region in correspondence with constant angular velocity. Moreover, the zoning is set in the track in order to record data at a substantially constant linear density. In addition, an area for recording administration information of the optical recording medium is formed at a predetermined position on the optical recording medium. As the administration information, identification information is recorded which indicates at least a fact that the recording medium is a phase-change recording medium and having the addresses expressed by wobbling tracks. Moreover, recommended information for the recording/reproducing operation at the inner peripheral position and the outer peripheral position is recorded. Thus, an effect can be obtained in that an environment for the recording/reproducing drive can be set to a satisfactory state because of the obtained function for expressing the type of the recording medium, the function for guiding the preferred recording/reproducing operation and the function for realizing the CLD method satisfactorily.

Since the value of the track pitch and the value of the central linear density are recorded as the administration information and information with which the track pitch and the central linear density can be identified is recorded, the function for identifying the type can be enhanced. Moreover, the recording/reproducing operation can satisfactorily be guided.

The optical recording medium or the recording method according to the present invention has the structure that the linking section is disposed between the data block serving as a data recording unit with respect to the track and the adjacent data block. Moreover, the size of data in the linking section is made to be the same as that of the minimum data unit (the sector) constituting the data block. Therefore, the process of the linking section (the process which is performed by the recording/reproducing apparatus) required as the rewritable recording medium can be simplified. Since the foregoing size is sufficiently large to establish the synchronization of the PLL, an effect can be obtained in that the function as the linking section can be enhanced.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical recording medium in which a track on which data is to be recorded is previously formed and said track is wobbled with a signal obtained by frequency-modulating a carrier having a predetermined frequency in correspondence with address information, wherein said track is a wobbling track having an amplitude amount of 10 nm to 15 nm and a track pitch of 0.74 μm to 0.82 μm.

2. An optical recording medium as claimed in claim 1, wherein said track is formed of a groove, and a side wall of said groove is wobbled in accordance with said address information.

3. An optical recording medium as claimed in claim 2, wherein said groove has a depth of λ/8 where λ is a wavelength of a laser light used to record data on said groove or to reproduce data recorded on said groove.

4. An optical recording medium as claimed in claim 2, wherein its diameter is taken as about 120 mm and a linear density of recorded data is about 0.35 μm/bit, it has a recording capacity of at least 3.0 GB.

5. An optical recording medium, comprising:

a track serving as a phase-change recording region on which data is recorded being previously formed and the track being wobbled with a signal obtained by frequency-modulating a carrier having a predetermined frequency in correspondence with address information and also wobbling serving as address information being formed in correspondence with rotation having a constant angular velocity, said track being a wobbling track having an amplitude of 10 nm to 15 nm and a track pitch of 0.74 μm to 0.82 μm, and an area on which management information for said optical recording medium is recorded at a predetermined position on said optical recording medium, said management information including identification information indicating a type of a medium as a phase-change recording medium having a track wobbled on the basis of at least address information.

6. An optical recording medium according to claim 5, comprising a plurality of divided zones such that data can be recorded on said track at a substantially constant linear density, and said management information including recommended information for a recording/reproducing operation each of at least at an inner peripheral position and an outer peripheral position.

7. An optical recording medium according to claim 5, wherein said management information includes at least a value of said track pitch and a value of a central linear density.

8. An optical recording medium according to claim 5, wherein said management information includes information which enables said track pitch and the central linear density to be identified.

9. An optical recording medium in which a track on which data is recorded is previously formed and wobbled with a signal obtained by frequency-modulating a carrier having a predetermined frequency in accordance with address information, comprising a linking section formed between a data block serving as a data recording unit for the track and an adjacent data block, a data size of said linking section being the same as a minimum data unit for constituting said data block, wherein said track has a wobble amplitude of 10 nm to 15 nm and a track pitch of 0.74 μm to 0.82 μm.

10. A method of recording data on an optical recording medium in which a track on which data is recorded is previously formed and wobbled with a signal obtained by frequency-modulating a carrier having a predetermined frequency in response to address information, comprising the steps of:

forming a data block serving as a data recording unit for said track and a linking section of a same size as a minimum data unit constituting said data block; and recording data such that said linking section is interposed between adjacent two of said data blocks, wherein said track has a wobble amplitude of 10 nm to 15 nm and a track pitch of 0.74 μm to 0.82 m.

* * * * *